(12) United States Patent
Herron

(10) Patent No.: US 6,637,497 B2
(45) Date of Patent: Oct. 28, 2003

(54) AUTOMOTIVE AND AEROSPACE MATERIALS IN A CONTINUOUS, PRESSURIZED MOLD FILLING AND CASTING MACHINE

(76) Inventor: David J. Herron, 1212 N. LaSalle Dr., #1604, Chicago, IL (US) 60610

( * ) Notice: Subject to any disclaimer, the term of this patent is extended or adjusted under 35 U.S.C. 154(b) by 0 days.

(21) Appl. No.: 10/141,664

(22) Filed: May 8, 2002

(65) Prior Publication Data

US 2002/0166651 A1 Nov. 14, 2002

Related U.S. Application Data

(60) Provisional application No. 60/289,646, filed on May 8, 2001.

(51) Int. Cl.[7] .............................. B22C 9/20; B22B 5/02; B29C 43/00; A23P 1/00; B65B 1/04
(52) U.S. Cl. ...................... 164/130; 164/133; 425/261; 264/297.7; 426/516; 141/113
(58) Field of Search .......................... 164/18, 129, 130, 164/133–136, 322–330, 335; 425/261; 264/297.6, 297.7, 500; 426/516, 448, 449; 141/113, 129–191, 281, 283, 250

(56) References Cited

U.S. PATENT DOCUMENTS 3,817,314 A * 6/1974 Deve ......................... 164/173

5,735,334 A * 4/1998 Sutton et al. ................ 164/130

* cited by examiner

Primary Examiner—Kuang Y. Lin
(74) Attorney, Agent, or Firm—Dennis L. Cook, Esq.; Fowler White Boggs Banker, P.A.

(57) ABSTRACT

Mold filling and feeding device (400) and process including using refractory filter cloth (202) to seal a mold line (100), in continuous conveyance, to a multi-stage pressurized filling and feeding device. The mold line (100) consists of vertically parted or horizontally parted green sand molds (101), or an extruded bed of media carrying various types of molds, including green sand, nobake, lost foam, investment casting shells, etc. These molds are bottom or side filled while moving for increased production rates. Feeding under pressure, while moving, is a second operation that improves casting integrity. The process includes a new and more efficient method of treating iron with magnesium for compacted graphite or ductile iron. A stitch (242) of filter cloth (202) holds modifying alloy (630) to the molds (101). A vacuum and pressure controlled column (550) provides consistent flow to thin walled castings, and pressurized feeding for heavy castings. Radiant energy losses are contained in the automatic system. The process and several special purpose machine components make a unified system for hardening liquid (600) such as molten metal in casting of aluminum alloy wheels or other metal castings, and also plastic polymer, rubber tires, etc., or food stuff, as in molded chocolate candy.

8 Claims, 19 Drawing Sheets

AUTOMOTIVE AND AEROSPACE MATERIALS IN A CONTINUOUS, PRESSURIZED MOLD FILLING AND CASTING MACHINE

CROSS REFERENCES TO RELATED APPLICATION

This application is entitled to the benefit of my Provisional Patent Application Serial No. 60/289,646 filed May 8, 2001, in the United States Patent and Trademark Office.

TECHNICAL FIELD OF INVENTION

This invention relates to the apparatus and processes of molding and casting, particularly to molten metal casting, for such as aluminum alloy wheels, but also to other thermally or chemically hardening liquids such as solidified foodstuff, plastics, rubber or other polymers formed in molds into solid articles for such as the automotive, aerospace industries, and food technology.

BACKGROUND AND PRIOR ART

For centuries, molds have been filled with molten metal to solidify into desired shapes. The processes have been adapted to other natural and synthetic hardening fluids ranging from chocolate to plastics, for example. The fluid or liquid may be poured under gravity from a vessel into an opening in the top of the mold. It may be pumped or flow under pressure into any area of the mold. The mold generally consists of a top and bottom section joined along a somewhat horizontal parting line. A cavity within the assembled mold corresponds to the desired solid shape. The opening for down pouring, or the "sprue", is usually cut or molded through the upper section of the mold, with some difficulties.

As most molten metals are highly reactive at the elevated temperatures required, defects often form in proportion to the speed of the filling or the height of the falling stream, both of which increase the turbulence of fluid flow and the reactive exposure; to oxygen, for instance. The mold itself may suffer erosion or liquid penetration of the mold media. The mold may even rupture under the forces applied.

Liquids usually undergo shrinkage of volume when cooled and changed into solids. This may cause defects or less than ideal mechanical properties. Additional feed liquid must remain in contact long enough to compensate for the shrinkage.

As casting has developed from an art into a science, skilled artisan foundrymen have continued to gently fill the mold cavity. They may allow time for a protective shell to solidify against the mold wall, and then fill an additional column or riser to compensate for the on-going shrinkage. The second operation is called "topping off". In this way, the mold is not exposed to high fluidity hot metal at the higher pressure. It is a time/temperature/pressure dependent physics issue. The additional pressure (as well as volume) of the higher riser(s) is necessarily added to penetrate the lattice-like dendritic structure of the solidifying metal, filling the micro voids of shrinkage with feed metal.

The artisan would also carefully cut or mold filling channels, being careful to streamline the flow as much as possible. These filling access channels, called "gating", distribute the liquid throughout the mold. Bottom filling gates have long been known as being most effective for quiescent flow. Special gating techniques within the mold, such as "horn gates" (the biological name implying structure) could achieve true bottom-filling after the initial downpour through the sprue.

To control defects today, the mold is designed at great expense to accommodate fluid flow principles and to provide the risers in one filling operation. This speeds the production process but requires higher quality molds, at higher cost, capable of withstanding the early pressure of the riser height for a longer time against hot liquid (time/temperature/pressure). The molds may be of precise aggregate media formulation, or of semi-permanent material, or permanent material (i.e. metal molds). A form of "horn gate" is often incorporated. A disadvantage of the gating and risers is reduced cast yield.

Demand for low cost, high speed production has led to highly automated molding machines. Today, the speed of the molding operation can be very rapid, perhaps a mold every eight seconds (i.e., advanced, vertically parted, green sand molding at 500 molds per hour). Unfortunately, fluid dynamic calculations may recommend the mold be filled at a considerably slower rate, perhaps thirty seconds. Production speed or quality is often compromised, necessarily.

Mechanical devices to gently and consistently pour the metal have largely replaced the manual pouring of molds. Production speeds and quality are often improved. Radiant energy losses are exceedingly high whether manually or automatically poured. Spillage, spatter and runout also pollute the plant environment and create hazards. The heat, smoke, fumes and hazards have long made the foundry an icon of harsh industrial conditions. Filling devices that contact the mold have been proposed with the potential of substantial energy savings and quality benefits. However, these necessitate stopping or slowing the automated mold movement with loss of production speed.

Demand for increased quality in castings has led to advanced molding techniques such as low pressure permanent molding, lost foam molding and ceramic investment molding. These and other high quality systems are notoriously slow processes.

Perhaps the best combination of quality and productivity (certainly the most commercially successful) was described by the specification of U.K. Patent No. 848604 also known as the DISA ®process. This is a metal casting apparatus in which green sand mold halves are arranged one behind the other, providing a succession of molds with primarily vertical parting lines. This was revolutionary. The molds are conveyed or pushed in a tightly booked line through a gravity pouring zone and sequentially filled. The sprue is molded without difficulty along the vertical parting line.

In rare instances, movable ladles or launders have been indexed to the vertical mold's movements. This enables more suitable pouring speeds that are longer than mold cycle times, further enhancing quality and productivity. These techniques were short-lived, however, as vertical molding cycle times continued to decrease with innovations in programmable controllers and the hydraulic and pneumatic valves and cylinders of the sand compaction equipment.

In a modification of the DISA process, described in the specification of U.K. Patent No. 1,357,410, the molds are bottom filled. The velocity and pressure of the liquid metal cannot be controlled, however, to the extent required for casting of light metal alloys, such as aluminum. Vertical molding has not been widely applied to light alloys for other reasons also, discussed below. This is unfortunate for the automotive and aerospace industries. High integrity aluminum castings are critically needed. Much of the huge demand (for instance: automotive alloy wheels) has been met by low pressure permanent molding (LPPM) at slow speed and high operational cost.

The foam molding casting method has high capability for aluminum casting. It comprises embedding a pattern of foam plastics material (i.e. expanded polystyrene) or other replaceable material in loose sand. The process is quite slow compared to vertical green sand molding.

The foam molding technique also suffers from the disadvantage of sporadic filling defects. Further attempts to provide a method of casting whereby this problem is reduced as disclosed in the specification of U.S. Pat. No. 4,693,292, which comprises the step of feeding molten metal generally upwardly against the force of gravity. This is again a form of the ancient artisan's prior art "horn gate" which was called a "riser tube" (not to be confused with the traditional elevated shrinkage "riser"). These and other so-called "counter gravity processes" are exceedingly slow by waiting for solidification before the next operation. The mold must stay connected to a metal source for a time sufficient for the casting(s) within to at least become self-supporting. For high rates of productivity, multiple casting stations and sets of expensive molds are necessary.

The desired direction of solidification is always toward a source of liquid feed. In bottom filling, this is initially from the coldest liquid metal at the top of the mold towards the hot metal at the bottom. Natural convection within the mold, however, attempts to move the hot metal to the top of the mold over a period of time. This changes the direction of solidification to be more like a top filled system, the degree dependant also on alloy conductivity. Counter gravity casting may thus cause shrinkage porosity.

The specification of U.S. Pat. No. 5,477,906, disclosed a thermal extraction technique using a seal to isolate the mold from the liquid metal source and allow the mold to be moved more quickly, providing a more efficient use of the casting station. A solidified protective shell against the mold wall is still required before movement.

A variation of the low pressure casting method involves a small secondary metal source in the mold cavity itself With the secondary metal source, the mold can be inverted and then disconnected from the primary metal source. The casting is allowed to solidify elsewhere whilst being fed from the secondary metal source. Inverting equipment is required.

The known Cosworth ®process as disclosed in the specification of U.S. Pat. No. 4,733,714 utilizes such an inverting, or rotating, operation and effectively takes advantage of the fluid flow and solidification science discussed above. The Cosworth process achieved improved properties of casting by pressurized filling and feeding. The method dramatically slows the production speed however and it is not applicable to the high speed vertical molding process. It appears suitable only for light metal alloys.

These new processes are not well adapted to the commercially important ductile iron and compacted graphite metals. Being highly reactive, this metal does not adapt well to the discussed prior art. Slag inclusions and shrinkage defects are common. Horizontal green sand molding is still the best process for ductile iron, particularly if using the "inmold" (registered trademark) treatment process (discussed below).

The Danish equipment manufacturer, DISA®, has commercially proposed a mold sealing technique with low level filling of the vertical green sand molds by a pump. This was an effort to support aluminum casting. Unfortunately, under gravity or low pressure filling, molds are required to be permeable for escape of air and reaction products, especially to allow high speed filling. This requires a coarse mold media (i.e. coarse sand) or vents in the mold. Coarse sand, however, does not cool the metal rapidly enough to obtain the fine microstructure required for automotive and aerospace aluminum.

A much finer sand is also required to resist liquid penetration of the mold wall, if any appreciable pressurized shrinkage feeding is applied. The resultant low permeability of fine sand and the mechanical delay of contacting and disconnecting from the mold (also inserting the seal) would cause the vertical green sand molding system to lose it's high speed advantage.

Aluminum alloy wheels are an example of an enormously energy consumptive cast product. Huge worldwide demand for this casting, other metal castings, and other thermosetting liquids screams for a high production, high integrity, energy efficient process. In the case of aluminum wheels, high speed vertical green sand molding could be the method of choice if quality were enhanced comparatively with low pressure permanent molding. Contact methods of filling, as DISA has proposed, have the potential to eliminate radiant energy losses of exposed transfer operations and open sprues. The higher net yield of contact filling saves melting energy also.

If the vertical green sand mold could withstand highly pressurized shrinkage feeding, without rupture or penetration of the sand, high density cast wheels would be possible. If the mold media were finer, the castings would more rapidly solidify, producing the desired dendrite arm spacing and fine microstructure needed.

Another aspect that must be addressed in a comprehensive solution is the need for late addition of catalyst or modifiers in casting processes. For best grain structure a late sodium or titanium addition might be injected into aluminum alloy for automotive or aerospace castings. Liquid chemicals might be solidified or modified by a catalyst addition.

These additions typically complete their reaction quickly, or fade quickly. Pouring must be quickly accomplished. In U.S. Pat. No. 3,703,922, concerning the treating of iron with magnesium or rare earths, it was proposed that treating adjacent to or in the mold itself would minimize fade, among other benefits. This treatment idea has the most cost effective and environmental benefit potential. However, the process has not adapted well to vertical molding or to bottom filling. Reaction products can be minimized with less exposure to oxygen (being in the closed mold) but entrapment of the dross is still a challenge. Slow pouring speeds are required for cleanliness.

We are thus left with the choice of high quality casting or high speed casting, but not both. The high quality processes such as investment casting and lost foam are cost and labor intensive. Low Pressure Permanent Molding and the Cosworth Process involve delays for coupling, cooling, inverting, uncoupling, and other handling operations. Expensive mold media are also required. The high production processes, such as vertical green sand, require rapid and turbulent pouring or filling times to keep pace with mold speed. Pressurized solidification is impossible with high speed. The required permeable green sand mold media have inadequate heat absorption and inadequate resistance to fluid penetration. Bottom or side filling of any of these processes is a cumbersome project and challenges our desire for late treatments in the mold.

OBJECTS AND ADVANTAGES OF INVENTION OVER PRIOR ART

The two primary objects of this invention are to fill high speed molds with high quality results and secondly, to automate high quality casting techniques for high speed processing. Several necessary related objects and advantages result:

1. Vertical green sand molding machines with finer, more capable sand may run at optimum speed while the molds are gently, and slowly, bottom or side filled.
2. Vertical green sand molds may be highly pressurized without rupture or penetration.
3. High density, fine structure aluminum castings may be cast in high speed vertical green sand.
4. Aluminum alloy wheel production is enabled and vastly increased in vertical or horizontal green sand.
5. Lost foam molds may be continuously bottom filled, automating the process.
6. Investment castings, such as aerospace turbine blades may be rapidly cast in an automated fashion.
7. Various types, sizes and shapes of molds may be combined in one continuous, pressurized, filling and feeding machine.
8. A technique for multiple filtration of mold filling fluid is provided.
9. A liquid (particularly, a molten metal) treatment or modification method results, including precise production of ductile iron and compacted graphite iron castings.
10. A mold support device is embodied and suitable for reinforcing conventionally poured molds.
11. Energy is conserved by a greatly reduced exposure of molten metal.
12. A safer and cleaner environment results by eliminating metal splash in pouring.
13. Small and large foundries become more flexible and competitive.
14. Plastic and rubber molding operations can use the filling and feeding system, for such as tires.
15. Food processing in molds is automated and increased with cost and energy savings.
16. New filter cloth designs useful for sealing processes and liquid modification have resulted.
17. A sonic metal height control system has resulted.

Principles of Operation and Unity Of Invention

The solutions to the disadvantages of the prior art and to other difficulties not discussed, have not been reached prior to my comprehensive invention, as they come only by simultaneous application of certain principles producing a unity of invention. The following examples are not exhaustive and not always mandatory. The unity is not immediately obvious but will become so in study of the forthcoming drawings and detailed description.

1. Fluids are incompressible. When fluids are contained and displacement is not allowed, massive objects, such as molds, may float freely.
2. Sand and other mold media is of less density than liquid molten metal. When submerged in a bath of liquid metal, buoyant forces are generated against molds.
3. Filter cloth may be designed to allow fluid flow in one axis perpendicular to the cloth but effectively seal flow laterally and longitudinally. Cloth may be laminated to achieve other properties.
4. Cascading molten metals generate slag. Bottom filling of castings thus produces cleaner castings. Slow filling and/or filtering produces cleaner castings.
5. Increased pressure of filling aids the filling or casting of thin sections by overcoming the surface tension of liquid.
6. The surface tension of fluids limits the ability of liquids to penetrate a potential path of escape. Increased pressure is thus required to experience runout failure through a seal. As the potential path thins, the surface area to volume ratio increases, freezing the molten metal and forming a solid seal to any further leakage.
7. Modern green sand (clay bound) molding machines can produce molds of exceptional and uniform, density, hardness and strength. Yield strength exceeds 5 psi, or 3.45 N/cm$^2$. A pressure head of liquid metal against a mold may approach the molding squeeze pressure without yielding of the mold.
8. Under hydraulic ramming of green sand, the phenomenon of grain-to-grain contact can occur. In vacuum bound molds, or vibration packed, loose sand molds, the ultimate grain-to-grain contact occurs, making molds as hard and rigid as stone. By restraining shear in all directions, such molds may push one another in an unlimited line traveling in one direction.
9. A height of liquid produces a pressure proportional to the density and height of the liquid column above a point. Additional pressure may be applied to the column of liquid by air or inert gas pressurization for filling and/or feeding.
10. Vacuum may lift a column of liquid proportionately to the density of the liquid under influence of gravity and the percentage of atmospheric pressure evacuated. Forty to fifty percent evacuation is within the practical limits of industrial vacuum and is equivalent to, approximately −7 psig or −4.83 N/cm$^2$.
    This approximately equals a vacuum of:
    14 inches Hg (35 cm);
    27 inches Fe (69 cm), and;
    88 inches Al (224 cm).
    Compact vacuum and pressure controlled furnaces may be built handling metals within these height limits.
11. Hot expanded molten metals contract and shrink as they cool and solidify. This contraction must be supplemented with additional feed metal.
12. Castings cool and freeze from the surface inward, initially producing a solid shell over a core of liquid metal. Solid dendrites grow from the surface into the centerline liquid blocking the flow path of additional feed metal. Increased pressure during solidification will drive feed metal through the structure, producing denser, stronger castings.
13. Liquid metal can penetrate sand grains under excessive pressure, creating a poor surface finish in a casting. Limiting the pressure until a solid shell forms will produce a better surface. Very fine mold media produces a better surface finish and more rapid solidification. Finer media requires pressurized filling due to lower permeability.
14. In casting, solidification shrinkage feeding is always partially accomplished through the gates used for filling the mold. Specialized gates called risers (rising above the casting) normally complete the feeding. In the subject invention, gating and risering are synonymous and usually referred to as gates 108.
15. Ultrasonic waves may pass through porous media to a sufficient degree to back-reflect from the boundaries of denser material beyond. The travel time of the wave may be measured electronically and be converted by an algorithm into precise measurement of material thickness or depth.

16. Data loggers may continuously monitor molten metal depth and pressure, within and around or above the molten metal to regulate applied pressure. Computer processors may continuously analyze such data to adjust for changing conditions and accurately control a process.

SUMMARY OF INVENTION

The apparatus and processes of the subject invention work in unity or separately to continuously fill any and all types of molds at selectable and controlled pressure(s) and filling speed(s). The filling is independent of mold production cycle time. In the preferred embodiments, pressurized, shrinkage feeding of moving, solidifying castings is a second operation that produces high integrity castings. Liquid treatment methods such as filtration, alloying and modification are accommodated and improved in association with the process.

Use of the machine and process is applied to various ferrous and non-ferrous cast articles including aluminum alloy wheels and engine cylinder heads. The invention applies to any hardening fluid or liquid element or compound, molded or cast for any industry or use, with quality, cost, environmental and energy conservation benefits.

BRIEF DESCRIPTION OF THE DRAWINGS

The invention will now be described, by way of example only, with respect to the drawings in which.

THE PREFERRED EMBODIMENT OF COMPONENTS OF THE INVENTION

Reference is now made to the attached drawings that discloses descriptions of several of the embodiments for producing high integrity castings or moldings at high speed and yield with substantially decreased costs.

The preferred embodiment of the invention depends upon the material to be cast, the size of the operation, and the primary molding method.

Figure 1:
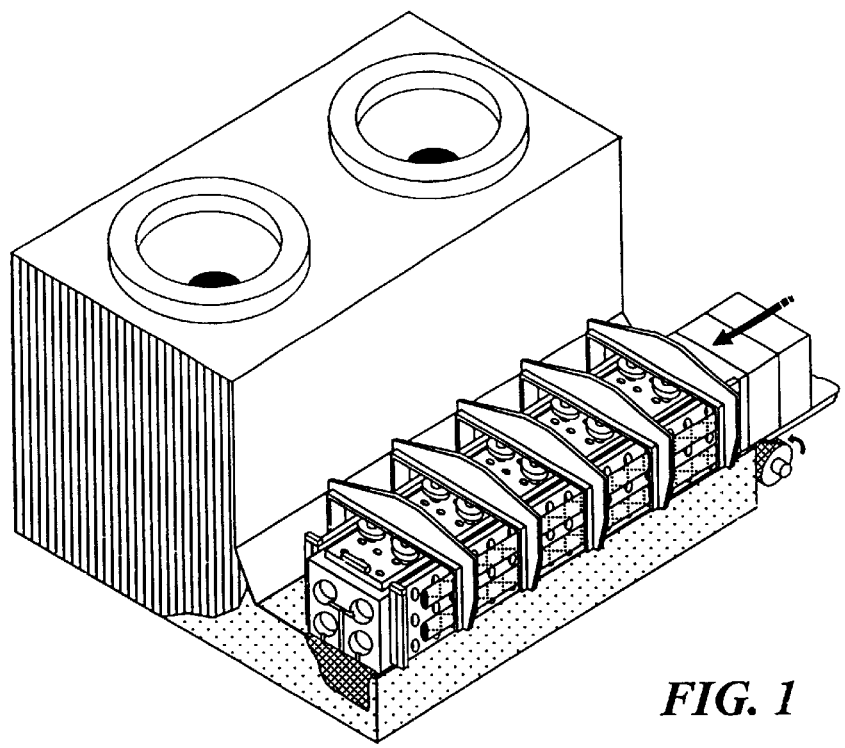
FIG. 1 is a perspective view of a simplified form of the preferred embodiment of the invention. Superstructure and reference numerals are removed for clarity.
Figure 2:
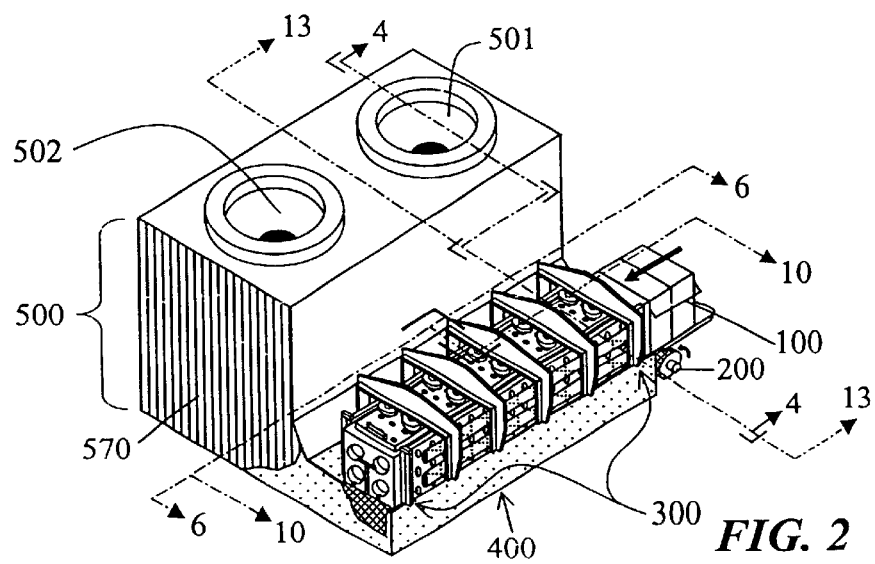
FIG. 2 is FIG. 1 again, reduced, with section lines and reference numerals.

In FIG. 1 the machine is in a simplified form. The length and number of individual components has been reduced. In FIG. 2, major assembled components of the preferred embodiment are:

a line of molds 100;

a filter cloth dispensing roll 200;

a mold support/pressure restraint device 300;

a single or multi-chamber, filling and feeding device 400;

a single or multi-chamber holding furnace or vessel 500, utilizing vacuum and/or pressure, controlled by a computer (not shown) processing a control algorithm according to input data;

a stitching device for alloy modification of molten metal 600;

an operating casting facility, or superstructure 700, with a product to be cast, such as the preferred embodiment:

vertically parted, green sand molded, automotive aluminum alloy wheels.

Other peripheral devices necessary to the invention, but not shown, are:

superstructure, utility lines, hoods, safety guards, raw material (i.e. molten metal 600) delivery, extended mold cooling, shakeout, a molding machine and other items.

Figure 3:
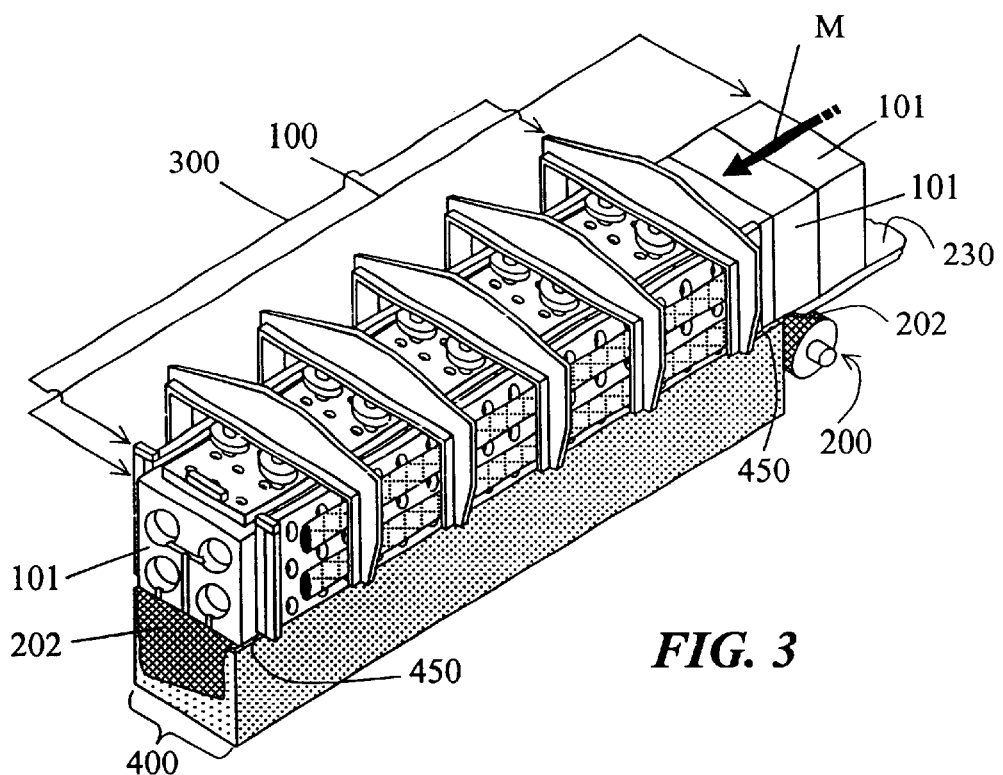
FIG. 3 is the perspective view again, enlarged, with holding vessel removed at-6—6, FIG. 2.

A modern, high speed, green sand molding machine, for instance, continuously or intermittently, conveys molds into the invention as illustrated by the arrow M (in FIG. 3 and many of the drawings). Other bold arrows clearly indicate rotational or linear direction of movement when such arrows will aid the understanding of the drawings.

Additionally, molten metal 600 (in FIG. 4 and subsequent drawings) flows throughout the invention, cooling into solid metal castings 650 (in later drawings). Application of the invention is also intended to any hardening liquid by any process of reaction or transformation.

FIGS. 3–15 have in mind the casting of automotive brake rotors, drums, pistons, pulleys, hubs, flywheels, plates, or other multi-cavity castings 109 but the methods invented are not limited to the shapes 109 or illustrations shown. It is known that any liquid, which hardens or transforms into any solid state by any process, may be continuously or intermittently impressed into any type of molds by the subject invention. The filled molds may continue moving in contact with the impressed liquid in the filling/feeding device 400 while undergoing controlled pressurized transformation or reaction of any type, such as solidification.

Referring to FIG. 3, in which the holding furnace/vessel 500 has been omitted, the individual molds 101 are typically ejected and pushed from a molding machine (not shown) across a steel deck plate 230 and booked into a mold line 100. This can be done manually with other types of molds. This movement may be continuous or intermittent.

The reference numeral 100 depicts a MOLD LINE.

In this preferred embodiment, a line 100 of vertically parted green sand molds 101 (see FIG. 3 and subsequent drawings) are being filled with molten metal (not shown) which is solidified under pressure in a continuously or intermittently moving mold line 100 (in FIG. 2). Mold travel direction is represented by the bold arrow M (in FIG. 3 and other drawings).

Figure 9:
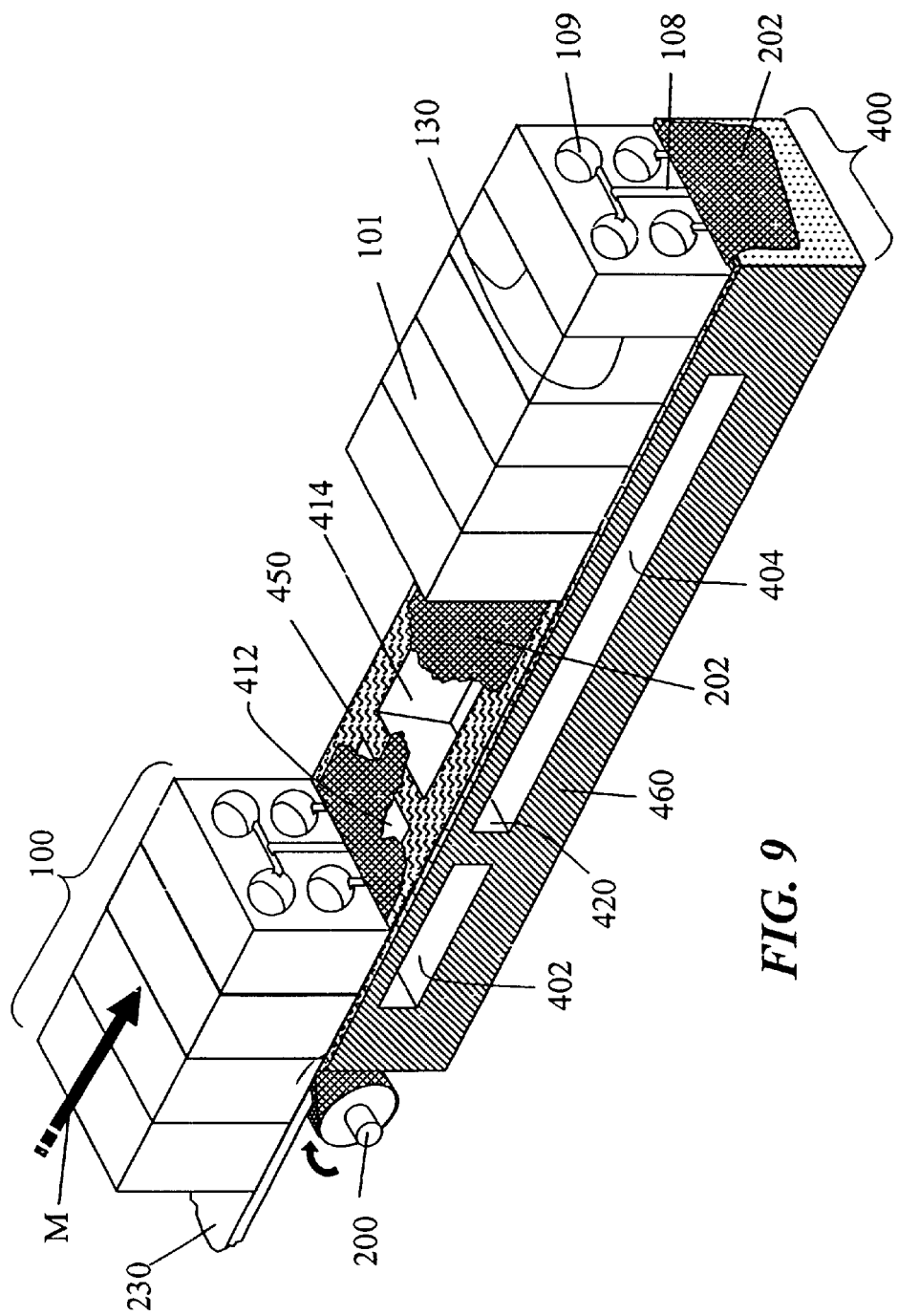
FIG. 9 is an enlarged view of FIG. 8 with certain molds removed to view inside.
Figure 36:
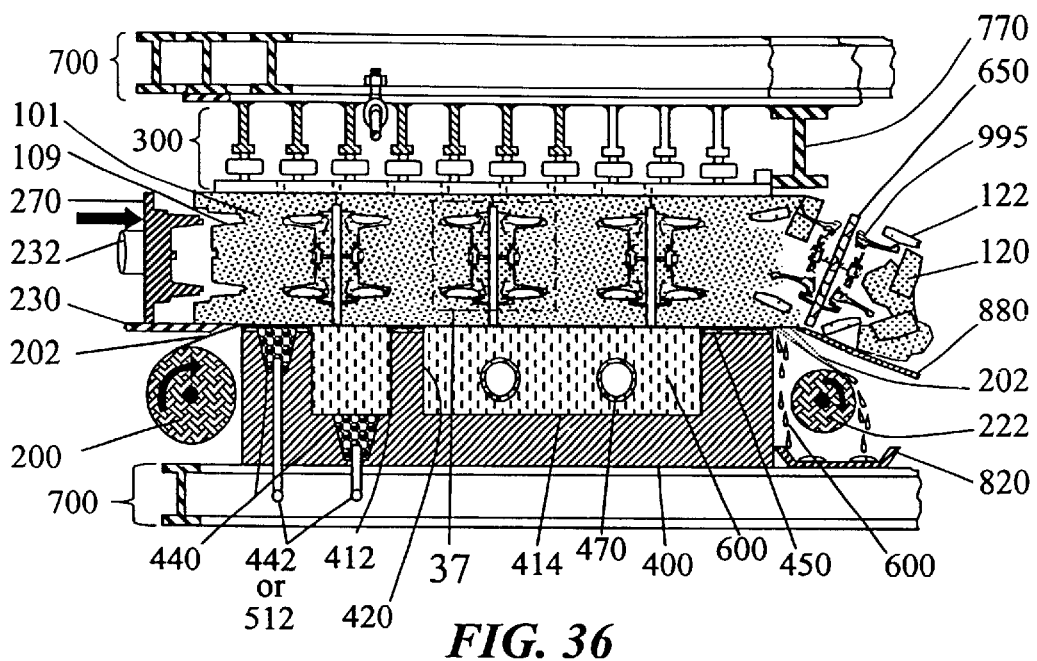
FIG. 36 is a sectional schematic view similar to FIG. 10 modified to show the preferred embodiment of a method for casting automotive aluminum wheels.
Figure 37:
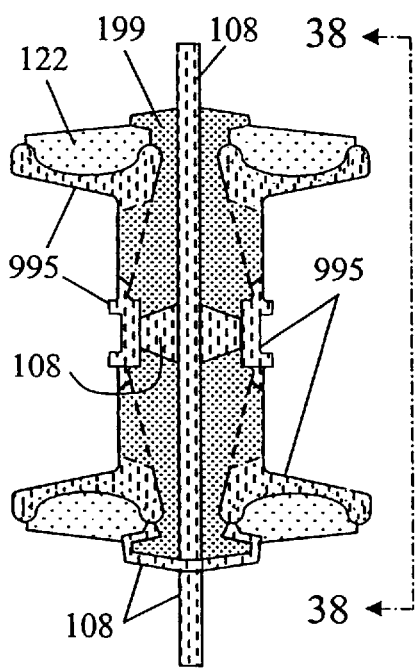
FIG. 37 is an enlarged inset 37 of two wheels from FIG. 36, side schematic view, to detail the preferred embodiment of the invented method.

Vertical green sand molding is embodied in FIGS. 1–15. The details of FIGS. 9, 36 and 37 show gating 108 and casting cavities 109 formed in the opposing faces of one block of sand, forming a mold 101. The single block molds 101 are booked together on the vertical parting line 130 (FIG. 9) to form the moving mold line 100. FIGS. 36–37 detail aluminum alloy wheels 995.

Embodiments to be discussed later show that the mold line 100 may be a composition of many different types of molds, i.e. freely moving permanent molds, semi-permanent, and loose sand.

Figure 7:
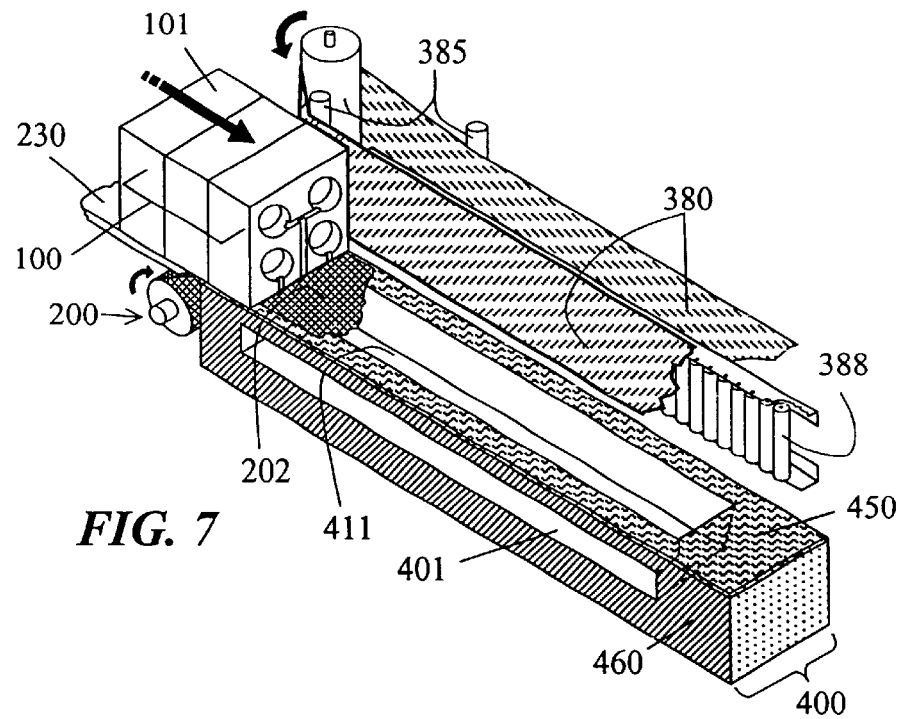
FIG. 7 is a cut-away view of FIG. 6 modified with an alternative embodiment.
Figure 8:
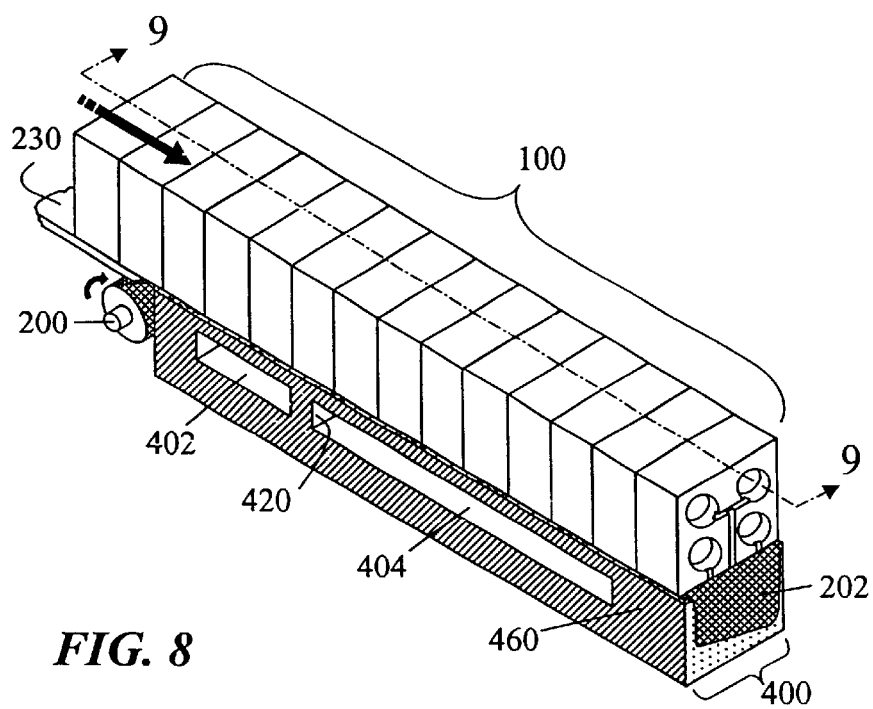
FIG. 8 is a sectioned view (6—6 from FIG. 2) with components removed for clarity, modified with the preferred embodiment.

Looking ahead briefly to FIG. 7, the mold line 100 passes onto the surface 450 of the refractory filling device 400 containing a chamber 411, shown empty in FIG. 7 but which can contain molten metal 600 (in subsequent drawings), or other liquids 600 supplied through a connecting channel 401 to the furnace/vessel 500.

Returning to FIG. 3, the molds 101 or mold line 100, being of considerable strength, bridge the filling/feeding device 400 and slide, together with optional filter cloth 202, also bridging and sliding over the filling/feeding device 400. The cloth 202 is bound by friction or by other methods to the individual molds 101. The refractory filling device 400 may be capped with a low coefficient-of-friction refractory surface 450 of ceramic or other material (best seen in FIGS. 4 and 7), to aid the sliding of the filter cloth 202 and mold line 100.

Figure 10:
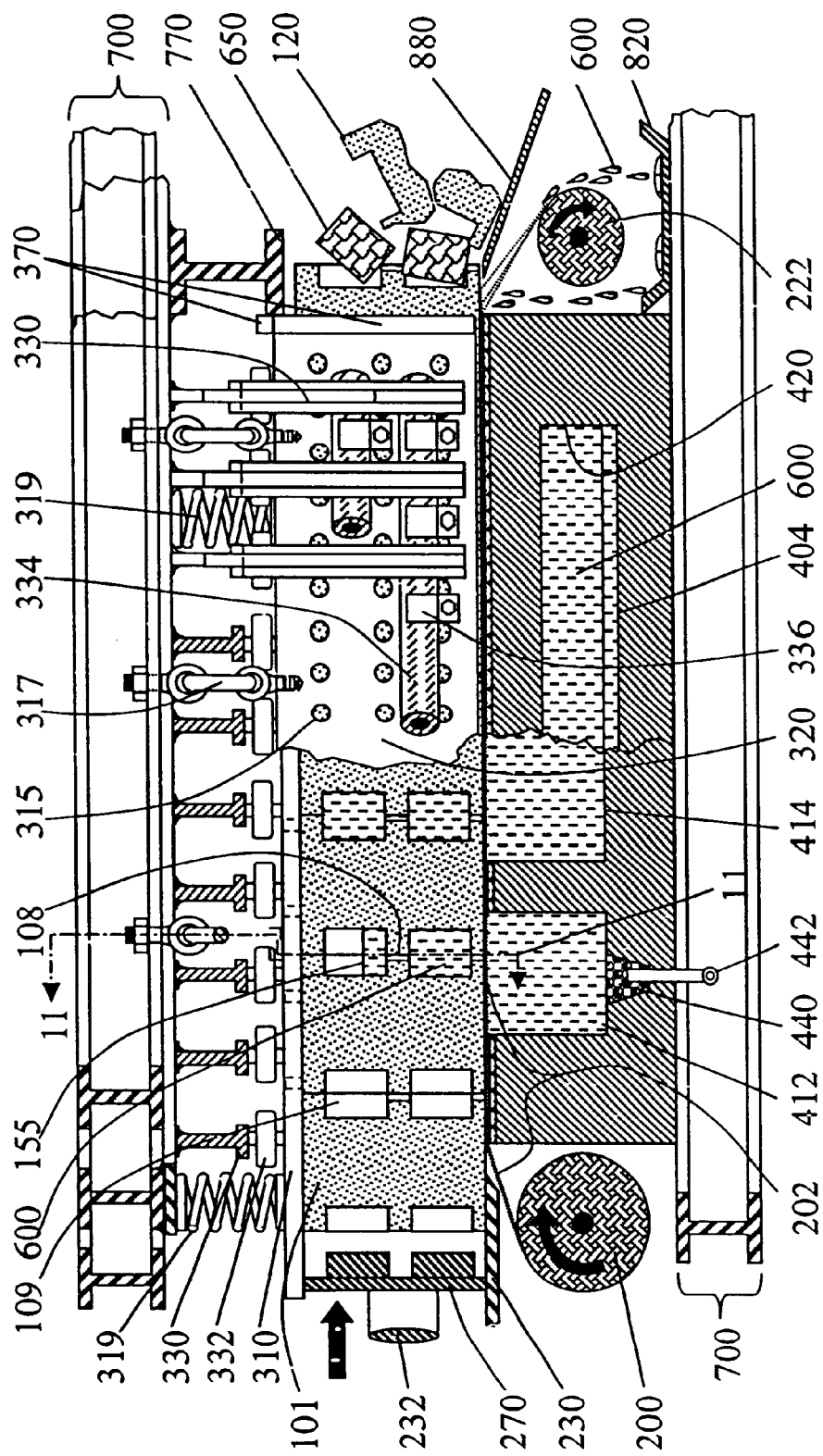
FIG. 10 is a section and cut-away view (6—6 from FIG. 2) with schematic representation to detail the preferred embodiment of the invented casting process and equipment.

In FIGS. 1–7, 10–15, and 19–22 (see FIG. 10) the entire mold line 100 is encased in a mold support or pressure restraint device (300 series) while passing over the filling/feeding device (400 series). In the section view, FIG. 11, molten metal 600 rises under low pressure from the filling chamber 412, passing through the filter cloth 202 and flows through the gating system 108 into the casting cavities or replaceable shapes 109. FIG. 10 shows the solid castings (650 and 91-5-995 specifically, later) are separated from spent molding sand 120 at the shakeout pan 880, usually after a distance of extended mold 101 cooling on a conveyor (not shown).

The entire assembly may be built rotated from the preferred bottom filling embodiment to create a side filling embodiment.

The reference numeral 200 depicts a FILTER CLOTH DISPENSING APPARATUS.

Figure 11:
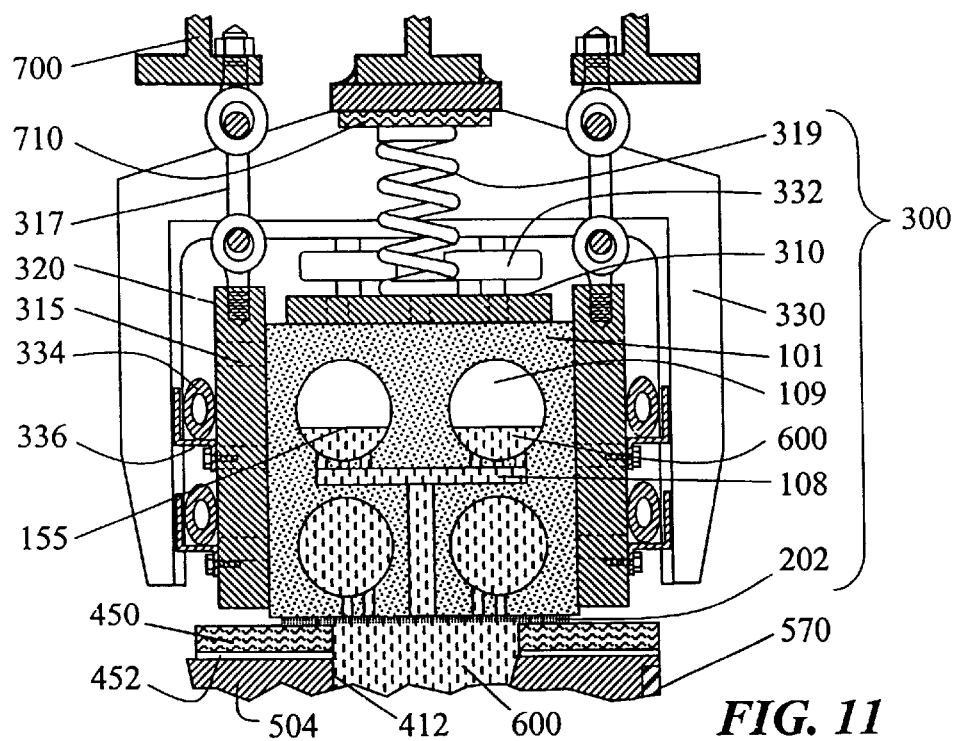
FIG. 11 is a sectional view (11—11 in FIG. 10)

The filter cloth 202, as shown FIGS. 9–11, provides additional sealing of the sliding molds 101 against the low friction surface 450 of the filling/feeding device 400. This prevents fluid runouts as detailed in FIGS. 14 and 27–29. The cloth 202 will also provide filtration of filling molten metal 600 and hold any loose mold media 111 (none shown here) from heat spalling in molds 101 above the filling/feeding device 400.

As the molds 101 travel in the direction of arrow M, the cloth 202 is dispensed from a free moving roller assembly, the filter cloth dispensing roll 200 (in FIGS. 2, 3, 6–10, 12, 16, 17, 20–22, 24 and 36). Friction with the molds 101 will grip and pull the filter cloth 202 from the dispensing roll 200 or other assembly for the function. The refractory filter cloth 202, such as fiberglass cloth for filtering aluminum or silica leeched filter cloth 202 for iron, is to cover the filling surface (i.e. the bottom or side) of the continuously or intermittently moving mold line 100. Slag 666, some loose sand 111, a small amount of molten metal 600, and some solid material 650 (metal "flashings" in FIG. 29) may be dragged out with the spent filter cloth 202 and collected on a take-up roll 222 over a spill pan or ingot mold 820.

Figure 27:
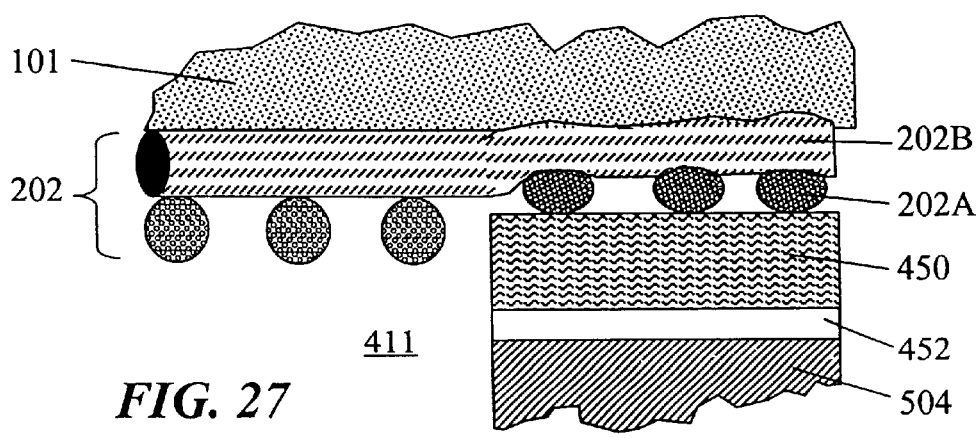
FIG. 27 is a detailed enlarged view of refractory filter cloth under compression for sealing the molten metal.
Figure 28:
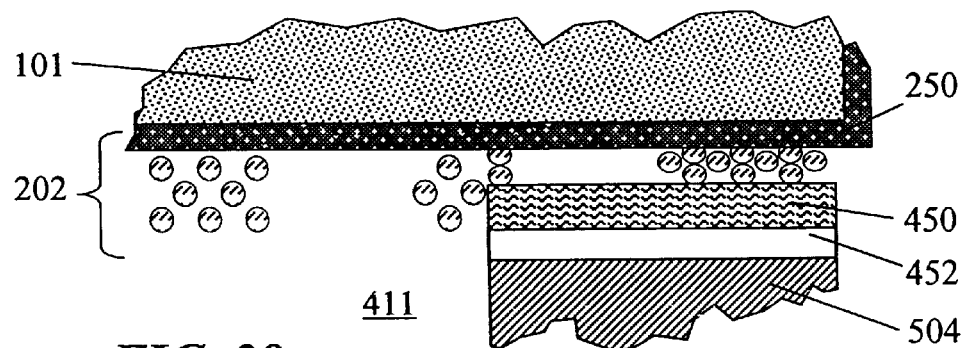
FIG. 28 is a detailed enlarged view of an embodiment of laminated filter cloth.

FIG. 27 is a close up view of typical fiberglass filter cloth 202 over the chamber 411 and in compression over the low friction surface 450 of the filling device 400. In FIG. 28, the compression of multi-layered cloth 202 is seen to create an effective seal against molten metal 600 leaks.

The castings may be produced with or without the filter cloth 202. Once the machine is primed with molds 101, the mold line 100 alone, without cloth 202, forms a moving hydraulic seal over the filling device 400 for high production, low cost castings that do not require filtration.

The reference numeral 300 depicts a MOLD SUPPORT/PRESSURE RESTRAINT DEVICE.

Figure 6:
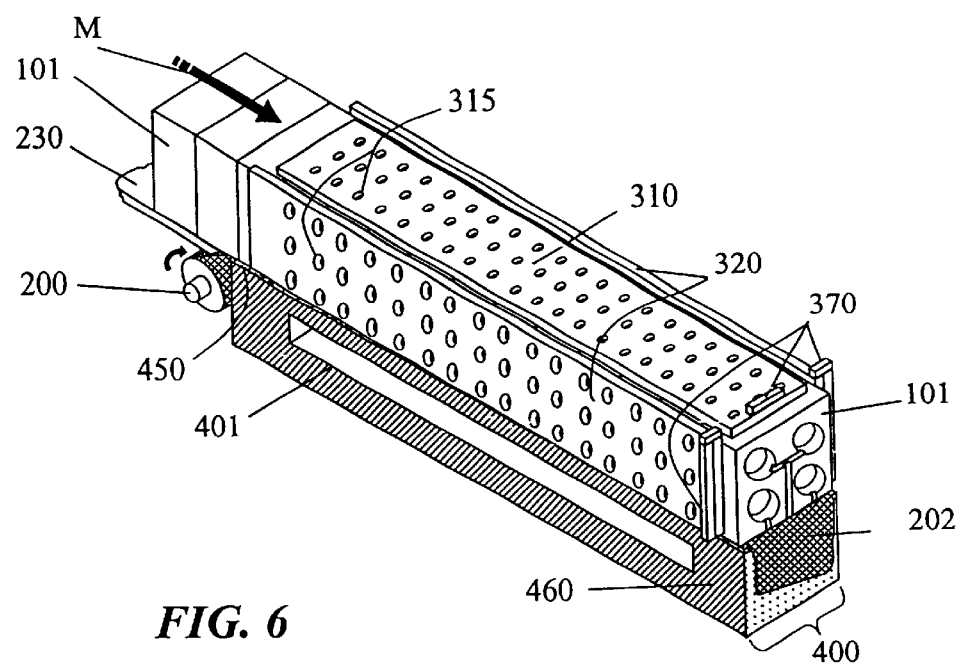
FIG. 6 is a sectioned view (6—6 from FIG. 2) with components removed for clarity, modified with a simplified alternative embodiment.

FIG. 6 is a sectional view (6—6 from FIG. 2) with components of the pressure restraining device 300 removed to reveal the underlying top pressure plate 310 and two side support plates 320. The plates (310 and 320) are generally suspended from plate hangers 317 and/or attached air cylinders 332 detailed in FIGS. 10 and 11. The top plate 310 is suspended by springs 319 in tension to allow vertical movement, extended by activation of the air cylinders 332 to press against the mold line 100. In this embodiment of the present invention, the plates (310 and 320) do not touch or interlock with each other or extend to the corners of the molds 101. They may completely seal and lock together, as in FIGS. 13–14 to accomplish additional purposes. The plates (310–320) may have vent holes 315 or other passages to relieve mold 101 gases.

The main purpose of the support plates (310 and 320) is to restrain the molds 101 from bursting due to the internal pressure of the molten metal 600 in the casting cavities 109 and gating 108. Another purpose is to prevent the mold line 100 from rising on the liquid 600 in the chambers 411–414 and breaking a pressure tight seal with the chamber surface 450. The invention allows pressure support while the mold line 100 is continuously or intermittently moving, easily on the liquid metal bath 600 of the filling/feeding device 400.

The preferred embodiment, as detailed in FIGS. 10–11, is an assembly of air cylinders 332 and/or pressurized air bladders 334 contained within a yoke 330. The yoke 330 is attached to a superstructure 700 by welds 710. Heat-resistant, air bladders or pressurized "firehose" 334 hang by a bracket or tray 336 attached to the side support plates 320. Air cylinders 332 and bladders 334 expand between the yokes 330 and the plates (310–320) to precisely press the plates (310–320) against the moving mold line 100 and/or molds 101.

This controls the amount of friction resistance the mold line 100 exerts to the pushing of the molding machine (not shown) or other embodiments for pushing. The mold line 100 to filling/feeding device 400 seal is thus maintained and molds 101 are supported against rupture from internal pressure of filling, solid metal 650 expansion or shear stress from pressurized mold 101 movement.

The mold line 100 tends to drag the support plates (310 and 320) along by friction. Stop bars 370 on one end of the plates (310 and 320) anchor against an anvil 770 as part of the superstructure 700, shown in FIG. 10. Plate hangers 317 also secure the plates (310 and 320) vertically and/or horizontally to the superstructure and foundation 700.

As mentioned, excess pressure after complete filling of the mold 101, including all casting cavities 109 and gating 108, could rupture the mold 101 or cause it to rise or float above the chamber surface 450 creating a serious runout of molten metal 600 or loss of pressure in either case. For safety, a pit (not shown) below the lower superstructure 700 should be available and sufficient to capture any failure of the system invented. Pneumatic, hydraulic or manual load controls are not shown but are of standard and safe mechanical technology.

The excess internal mold pressure is necessary for filling of thin sections of casting cavities 109 which resist the surface tension of liquid metal 600. The excess pressure is also necessary for high integrity solidification of most heat expanded molten metals 600.

For castings not requiring high integrity, the high internal pressure is not necessary. Light weight plates (310 and 320) or other devices may be used to prevent molten metal 600 runout. Mold support 300 may not be needed at all as the molds 101 are quite heavy and strong in themselves. The system is more efficient than prior art in the casting of simple or complex castings of high or low production quantity, as we shall see under operations.

Molds 101 are often made of a media of sand mixed with water or chemical binders and may contain other combustible or volatile additives. When subjected to the heat of molten metal 600, gases evolve that must be vented through vent holes 315 in the plates (310 and 320), or through the support belt 380, or to the corners of the mold 101 by way of pattern and mold features (not shown), or through the permeability of the mold 101 media.

Friction with the mold line 100 is a detriment in the embodiment of stationary plates (310 and 320) of FIGS. 6 and 10. Plates (310 and 320) should then be lined or made entirely of polished low coefficient-of-friction material (not shown) or should be lubricated to aid the sliding of molds 101 through the pressurized zone of this invented equipment.

The reference numeral 400 depicts a FILLING AND FEEDING DEVICE.

The vacuum/pressure filling and feeding furnace/vessel 500 (to be discussed) keeps the molten metal 600 supplied at a controlled pressure to the filling and feeding device 400. A side face/joint 460 (FIGS. 7–9) of the filling/feeding device 400 securely seals by any means, such as mortar 452 (FIG. 13) to the molten metal holding furnace/vessel (500 series). Molten metal 600 (in FIGS. 4–5) is fed through the connecting channel 401 from the furnace/vessel 500 or another liquid source (not shown). The refractory 504 filling/feeding device 400 may separate from the larger furnace/vessel 500 at the joint 460 for ease of maintenance, when needed.

In FIG. 7, a single chamber 411, by way of a single channel 401, is connected to a molten metal 600 holding furnace and/or pressure vessel 500 (FIGS. 4, 5, and 13) in which a height of molten metal 555 (FIG. 5), with or without additional pressurization from applied gas, is sufficient to fill the molds 101 with molten metal 600.

For castings not requiring high integrity, a high pressure feeding is not necessary. A single, short, filling chamber 411 (FIG. 7) will steadily fill a conventional gating system 108. Quiescent bottom filling is achieved with improved yield, as a top pouring cup is not required. While some shrinkage feeding may occur through the single filling chamber 411, a conventional riser (not shown) will certainly feed the solidification shrinkage if the gating 108 is designed to quickly freeze, and close, above the filter cloth 202 after filling. Freezing the gating 108 by conduction into the mold 101 or mold media 111 prevents loss of static head pressure in the conventional prior art risers (not shown). This simplified system embodiment is more efficient than prior art in the casting of simple or complex castings, of high or low production quantity, as we shall see.

In FIGS. 1, 2, 8–10, 12, 15–21 and 36, a double chamber (412 and 414) is used as the preferred embodiment. The first is a low pressure filling chamber 412. The second is a higher pressure solidification shrinkage feeding chamber 414. The filling chamber 412 operates the same as the single chamber 411 system. The gating system 108 largely determines the filling time by restricting flow as desired and designed for each casting pattern (not shown). This, the applied pressure, and the speed of mold 101 movement dictate the necessary length of the filling chamber 412.

The feeding chamber 414 is connected, via the channel 404, to a second molten metal holding furnace or vessel 502 (in FIG. 2), in which a greater height of molten metal 555 (FIG. 5), or a greater pressurization of applied gas, or both, is sufficient for higher integrity solidification feeding.

Figure 22:
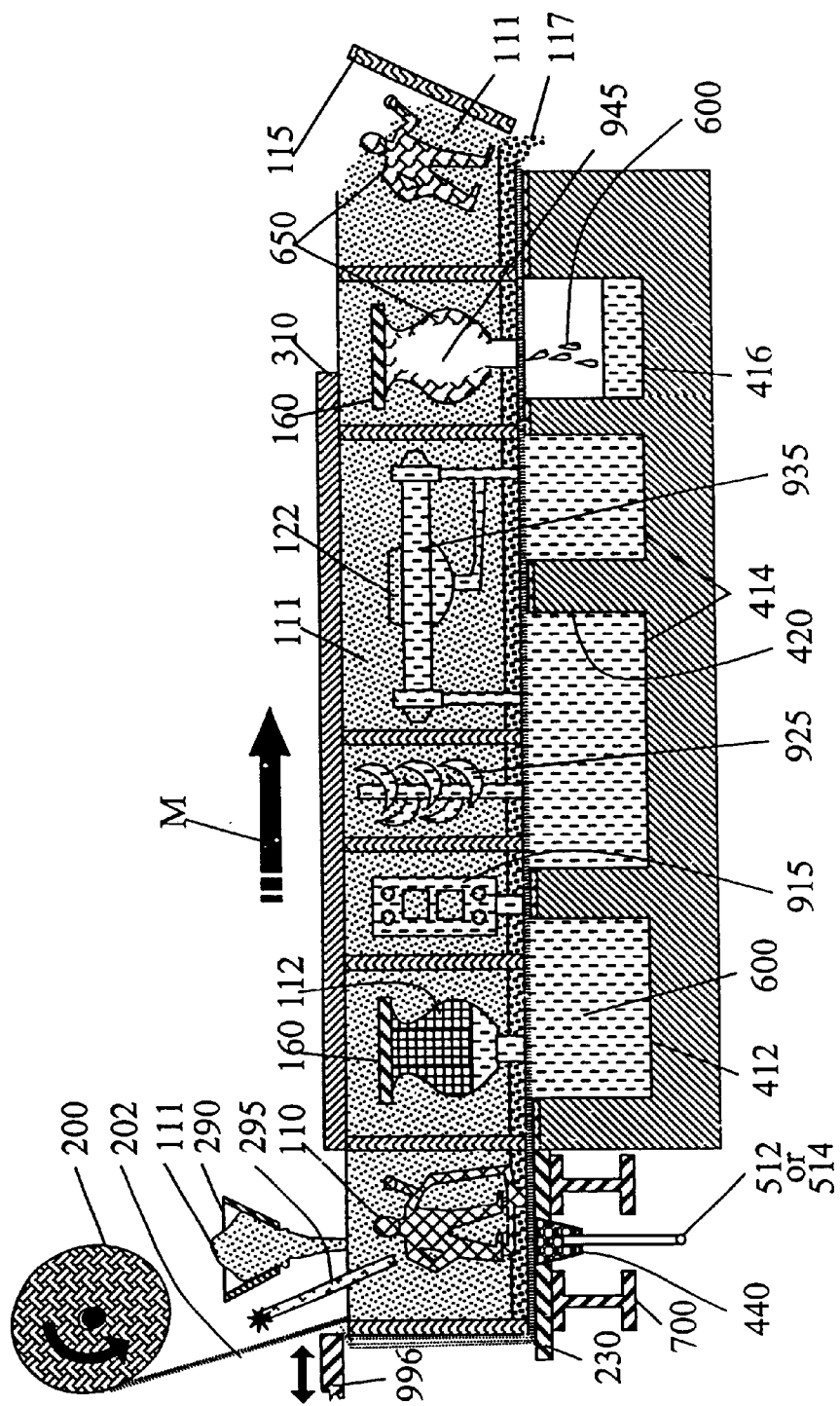
FIG. 22 is a sectional schematic perspective of advanced embodiments with holding vessel removed at 6—6, FIG. 2, and other components removed.

One or two, or even more, separate chambers (411–416), as embodied in FIG. 22, are thus invented to achieve various metallurgical results in this high speed, high integrity and highly flexible, casting process invented.

As certain metals, such as aluminum, are often purged of detrimental gases by flushing with inert gas, it is desirable that the invention provide this capability, especially in the casting of automotive alloy wheels. The inert gas bubbles (not shown) will attract dissolved gases so that both float and escape the liquid metal 600. This could be essential if vertical green sand molds containing clay and water are used. Porous plugs 440, in FIG. 10, or lances (not shown) in the filling device 400 introduce the inert gas under pressure. The inert gas (not shown) flows through the liquid metal 600 within the filling chamber 412, then through the filter cloth 202 and through the permeable mold 101 and finally escape through the venting system holes 315 or other forms of accommodation, discussed or imagined.

Figure 12:
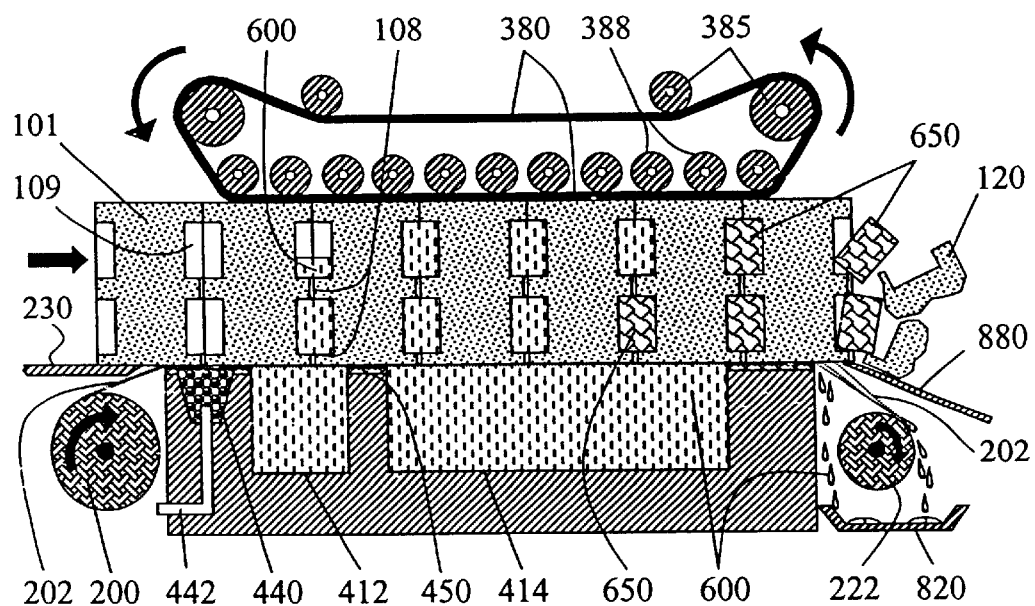
FIG. 12 is a schematic cross section of the invented process showing an alternative embodiment.

Other metals, such as brass, magnesium and iron treated with rare earth metals, naturally release vapors. These can be accommodated by this invention through the holes 315 or as follows:

In FIG. 12, a porous plug 440 is installed integral with the chamber surface 450 prior to mold 101 filling. Several invented methods are in mind as parts of this total, high integrity, invented system. Prior to filling, vacuum may be drawn through the sand by way of this porous plug 440, or, inert gas flushing of the mold line 100 through a gas line 442 may be accomplished. The benefits shall be discussed later.

Figure 4:
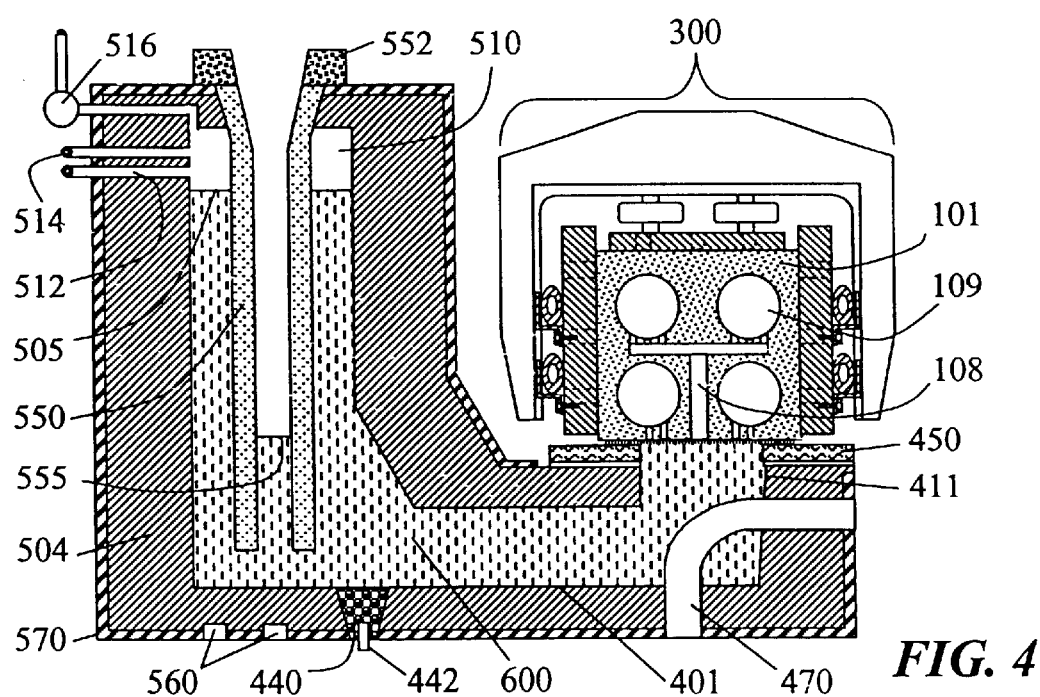
FIG. 4 is a sectioned view of the invention (4—4 in FIG. 2) with liquid under vacuum.
Figure 5:
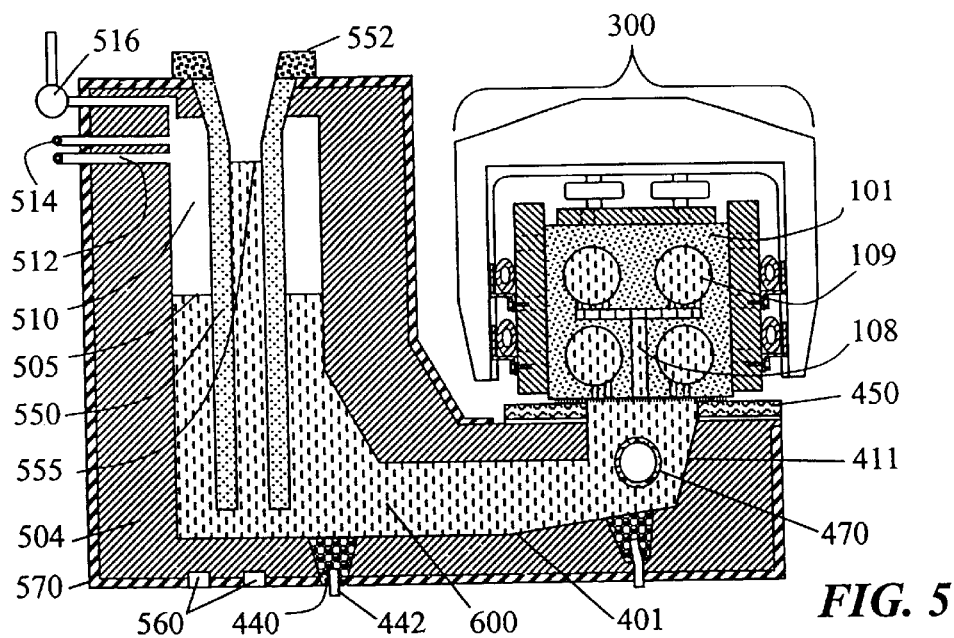
FIG. 5 is a sectioned view of the invention, with molten metal, for example, under pressurized filling and solidification shrinkage feeding, modified from FIG. 4.
Figure 21:
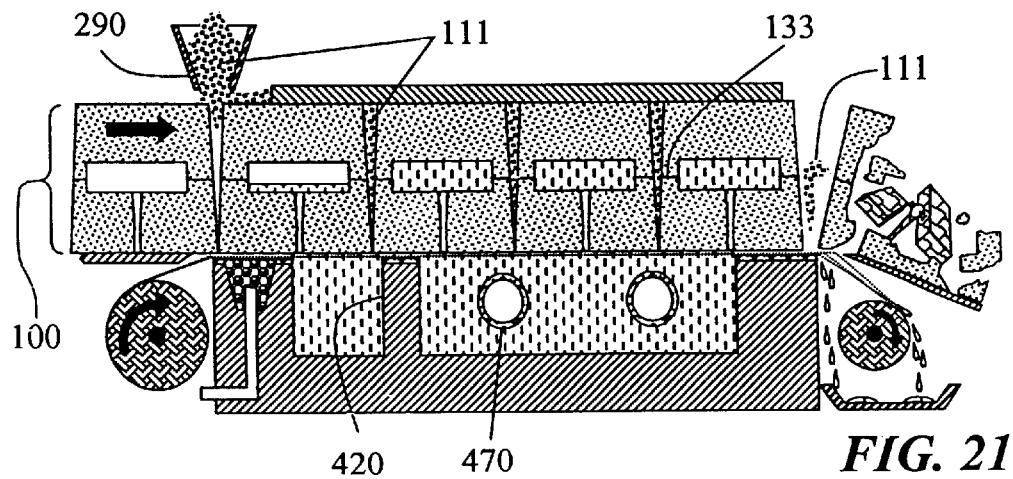
FIG. 21 is the same view as FIG. 20, modified with an alternative embodiment.

The feeding chambers (411 or 414) may benefit from the embodied system of optional submerged ceramic burner tubes 470 to maintain and control temperature of the molten metal 600. In FIG. 5, such a burner tube 470 is installed lengthwise throughout the filling device 400. In FIGS. 4 and 21, multiple tubes 470 pass through the chambers (411 or 414) at right angles to the filling device 400.

Besides many other benefits in the preferred multi-chamber embodiment, the foremost is pressurized solidification. Aluminum castings, with high elongation and strength, cast in sand at low cost, are a primary object of this invented process, system, methods, and equipment.

With highly pressurized filling, very fine sand with low permeability and high thermal capacity can be used. Plaster and other high integrity molds are accommodated and automated for high speed. Aluminum castings, with excellent surface finish, at low cost, such as automotive wheels, are a primary object of this invention.

Figure 29:
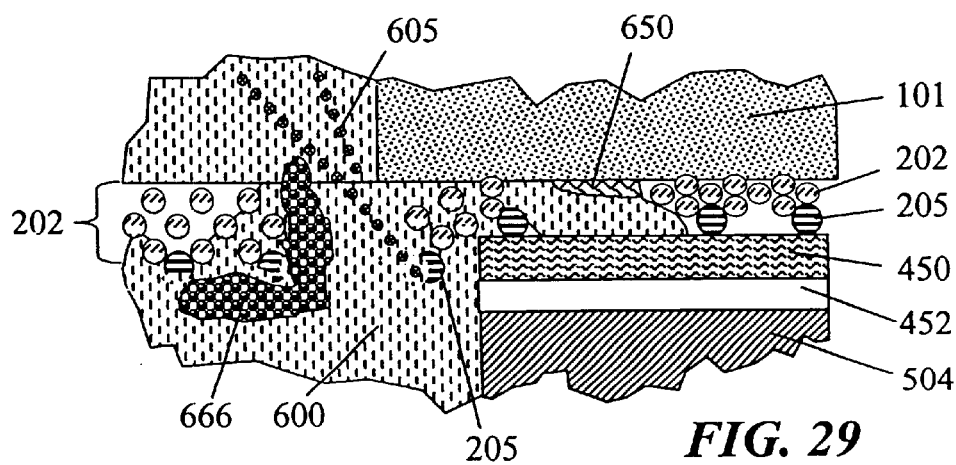
FIG. 29 is a schematic view of sealed liquid with laminated wire alloy modification.

Illustrated in FIG. 29 is the penetration of the liquid metal 600 into the cloth 202 under pressure. Surface tension of the liquid 600 and solidification of the metal 650 hinder any penetration and leaking or loss of pressurization. The width of surface 450 sealed may be increased as necessary for the molten metals 600 cast. Oppositely, the width of the chambers 411 414 may be increased to provide more fluid support of the mold line 100. The amount of mold 101 flotation is adjusted to optimize ease of movement and exposure to gating 108.

The filling and feeding device 400, in any embodiment, may be used independently of any or all other components.

The reference numeral 500 depicts a VACUUM AND PRESSURE FURNACE VESSEL.

In FIG. 5, a column 550 suitable for receiving liquid 600 from above is connected at the bottom to a pressure vessel 500 in an inverted siphon or letter U shaped relationship. This column 550 is generally open to the atmosphere. It is made of a ceramic, or high density refractory, or a metal material and seals the pressure vessel 500 at the top. Liquid 600 accumulates when elevated from below by pressure in the space 510 above the metal 600 in the furnace vessel 500. This pressure is monitored and adjusted simultaneously with molten metal 600 additions to the column 550 from above. Molten metal 600 may thus be replenished to the furnace/vessel 500 while maintaining vacuum in FIG. 4 or pressure in FIG. 5. A less expensive refractory inlet collar 552 protects the ceramic column 550 and the sealed furnace/vessel 500. The furnace/vessel 500 is, of course, a pressure vessel and must be totally encased in a steel shell 570 or other suitable material.

In FIG. 4 at startup, vacuum is created in the space 510 above the metal 600, achieved through the vacuum line 512 to a vacuum pump (not shown). The amount of vacuum is regulated, manually or by computer (not shown), by way of the regulator line 516.

The height of metal 455 in the filling/feeding chamber 411 is dependent upon the degree of vacuum achieved and the density of the particular metal 600 under gravity. The metal 600 is withdrawn at startup (very low in FIG. 13).

Pressure for filling molds 101 and for feeding solidification shrinkage is dependent upon the metal height 505 in the holding furnace/vessel 500, the gas pressure applied in the space 510 above the metal 600, and the resultant height of metal 555 elevated in the column 550. This is the steady state of normal operation.

The height of metal 555 in the column 550 equals the height of metal 455 in the chamber 411 when both are under normal atmospheric pressure. The filling column or inlet chamber 550 may also be slightly pressurized to control fading of alloyed metals. The difference in pressures inside the furnace/vessel 500 controls the operation.

Any excessive height of metal 555 in the furnace/vessel 500 filling column 550, being more than enough to fill the molds 101, will create:

buoyant force or liquid pressure support on the mold line 100, rupture stress within the molds 101, sand grain 111 metal penetration forces, and, fluid pressure on the filter cloth 202 sealant.

These stresses are controlled in the present invention in several ways. First, the molds are restrained by the pressure restraint device (300), the preferred embodiment in FIGS. 1–6.

Mainly, in the preferred embodiment, the vacuum and pressure controlled, filling and feeding, furnace or vessel 500 controls the listed stresses. When height of metal 555 is excessive for the mold 101 capabilities, partial vacuum, as needed, is controlled by the regulator 516 and vacuum line 512 in the space 510 above the metal 600. A proper head pressure is thus achieved by the height of metal 555 in the furnace filling column 550 even though height of metal 505 in the furnace/vessel 500 rises under vacuum to a higher level 505, as shown in FIG. 4.

When the height of metal 555 is insufficient for proper filling of the molds 101, the regulator 516 now applies pressure through the pressure line 514 into the space 510 above the metal 600. Height of metal 505 decreases in the furnace/vessel and height of metal 555 increases in the filling column 550. Thus the applied static head pressure in the molds 101 is controlled and equal to the difference in height 555 in the furnace filling column 550 compared with the filled height at all points in the molds 101, multiplied by the density of the particular metal 600.

Metal height (505 and 555) is monitored by ultrasonic level detectors 560 or other sensors, in the bottom of the furnace/vessel 500. The readings are processed by a computer (not shown) to control the height 555 in the column 550, by varying the pressure and vacuum controlled height 505 in the furnace/vessel 500, applying pressure or vacuum in the space 510 inside the furnace/vessel 500, as needed.

The software algorithm detects changes and produces output to be used by automatic controllers (not shown) or manual operators of the invention. Among the changes detected and monitored within the furnace/vessel 500, and throughout the invention, are:

sudden molten metal 600 additions;

steady additions of molten metal 600;

steady or intermittent subtractions of molten metal 600 due to mold 101 filling, molten metal 600 shrinkage feeding, and/or system leakage;

gradual volume changes due to refractory (504, FIG. 4) wear;

sudden gas pressure changes and/or metal height (505 and 555) changes signaling catastrophic failure and shutdown, and;

other optional or necessary parameters for fine adjustment, such as barometric pressure, mold 101 permeability, etc.

The ultrasonic sensors 560 and pressure regulator 515 or other means, collect and process signals to and from the computer (not shown) to operate the gas line 514 and vacuum line 512, controlling the desired metal height 555 in the furnace/vessel filling column or chamber 550.

Steady, pressurized filling, and pressurized solidification feeding, is thus uniformly and precisely accomplished at high production speed. Replenishing the furnace/vessel 500 is by direct pour into the filling column or inlet chamber 550 without affecting filling or feeding pressure on the mold line 100.

In large scale operations, this vacuum and pressure controlled vessel 500 is usually heated by standard means. In such cases it is appropriately called a furnace/vessel 500. An electric channel inductor (not shown) may be attached beneath the furnace/vessel 500, for instance.

The vacuum and pressure controlled furnace/vessel device 500, in any embodiment, may be used independently of any or all other components of the subject invention as alternative embodiments.

Figure 24:
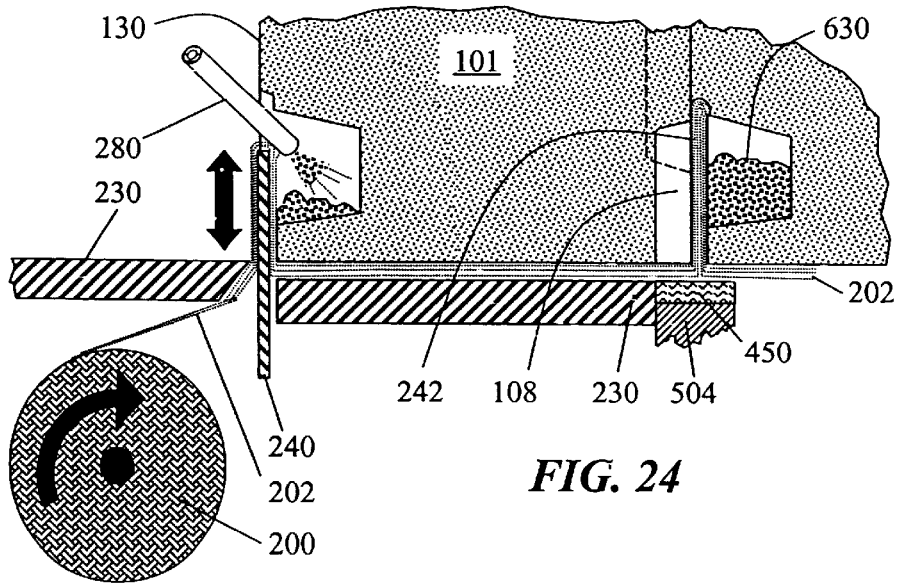
FIG. 24 is a detailed sectional schematic of an advanced embodiment.

FIG. 24 depicts LIQUID OR ALLOY MODIFICATION WITH MOLD STITCHING.

FIGS. 23–26, 31, 34 and 35 show inserting a section of filter cloth 202 in a "stitch" 242 between the molds 101. This preferred embodied method, called "mold stitching", accomplishes several things. Without mold stitching, the mold line 100 might slide separately on top of the filter cloth 202, failing to pull the cloth by friction from the filter cloth dispensing roll 200. The mold stitch 242 binds the cloth securely to the mold line 100 at as many molds 101 as desired.

In FIG. 24, a blade or bobbin 240, actuated by pneumatics or other motor (not shown), inserts the cloth 202, of any material, to any depth upward, or in any direction depending on the location chosen. The stitches 242 firmly grip the cloth 202 for bridging the chambers (411–416) and for sliding across the low friction chamber surface 450.

Figure 34:
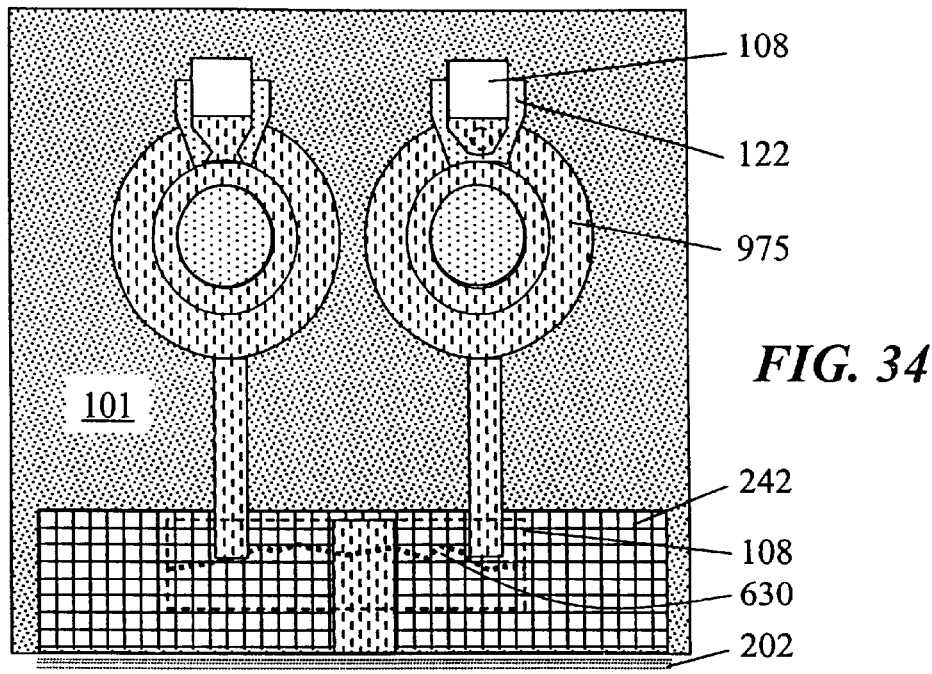
FIG. 34 is a schematic plan view of an embodiment for casting with a riser core with conventional risering and stitched in place alloying.
Figure 35:
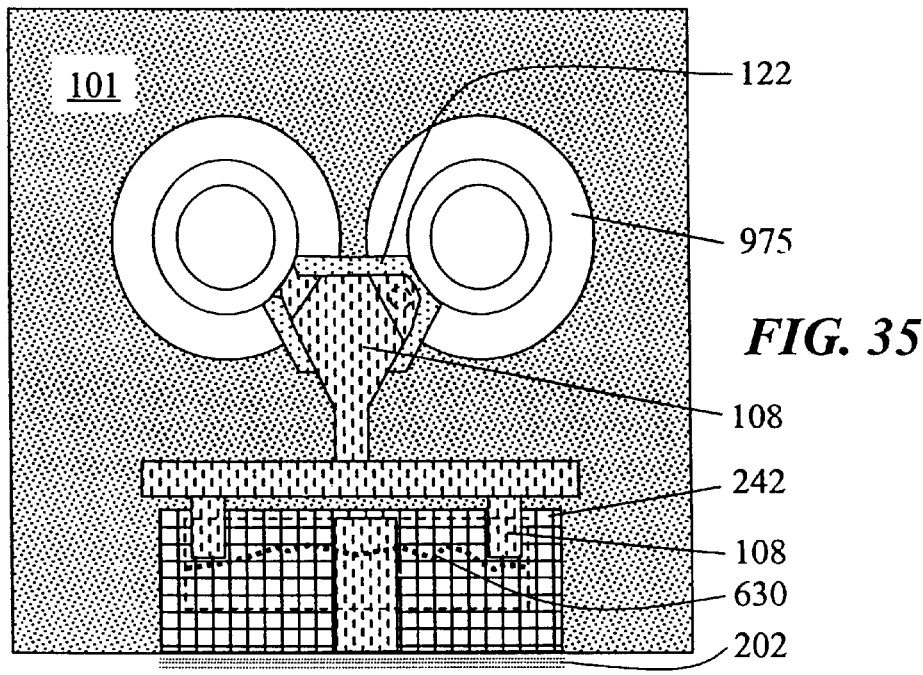
FIG. 35 is a schematic plan view of an embodiment for casting automotive and truck wheel hubs with pressurized solidification according to the invention.

Mold stitching 242 provides opportunities for elaborate molten metal 600 filtering with creative design of the gating 108. In FIGS. 24, 34 and 35, liquid 600 is filtered three times as it flows upward through the horizontal filter cloth 202 via the center post of gating 108. The metal 600 then passes perpendicularly through the double layered stitch 242, flows behind the stitch 242, and again passes perpendicularly through the stitch 242 at exit gating 108 toward both sides of the mold 101, continuing on toward the riser gates 108 and hub castings 975.

For critical applications, like aerospace or automotive aluminum alloy wheels 995, last moment, efficient modification with titanium, sodium or other additive or catalyst may be accomplished with the stitch 242. In FIG. 24, an alloy feeding tube 280 injects material behind the stitch by air or vibratory feeder (not shown). The alloy feeder 280 is withdrawn and the bobbin 240 is raised further, completely covering the alloy 630. The next mold 101 is booked into the mold line 100, to grip the stitch 242. The bobbin 240 is retracted, leaving the stitch 242 and the additive alloy 630 in place.

In the modification of aluminum with titanium, for instance, it is important to treat as late as possible before casting. The effect of titanium, and other inoculants and modifiers 630, fades rapidly. The invented process is a remarkable improvement over prior art, treating metal 600 between the molds 101.

In FIGS. 34–35 riser gates 108 are attached to round castings like hubs 975 through sand cores 122 or to alloy wheels 995 (in FIGS. 36–38) through special purpose cores 199. The risers 108 may similarly attach to casting cavities 109 through a stitch 242, although not shown, so that the gates 108 knock off more easily and evenly, to reduce grinding of the gate 108 contact on castings 975.

Filter cloth 202 may lose tensile strength with exposure to hot metal 600. Mold stitching helps to drag the cloth 202 out of the filling and feeding device 400. The metal 600 is continually skimmed of slag 666 and loose sand 111 in this way for high quality casting.

The mold stitching system, method, or device (240–242), in any embodiment, may be used independently of any or all other components of the subject invention, as alternative embodiments.

Alternative Embodiments

The following sections will describe modifications and applications that are embodied from the unified principles of the invention. The list of applications and alternative embodiments is not limited to the illustrations given.

A) Alternative Mold Support Devices

Figure 13:
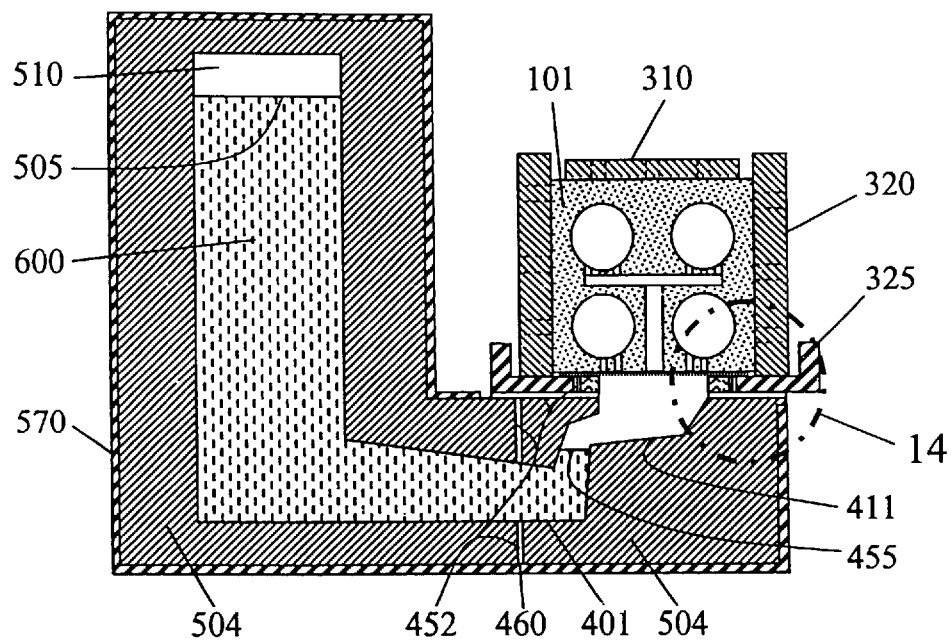
FIG. 13 is a cross section (13—13 in FIG. 2) of an alternative embodiment.
Figure 19:
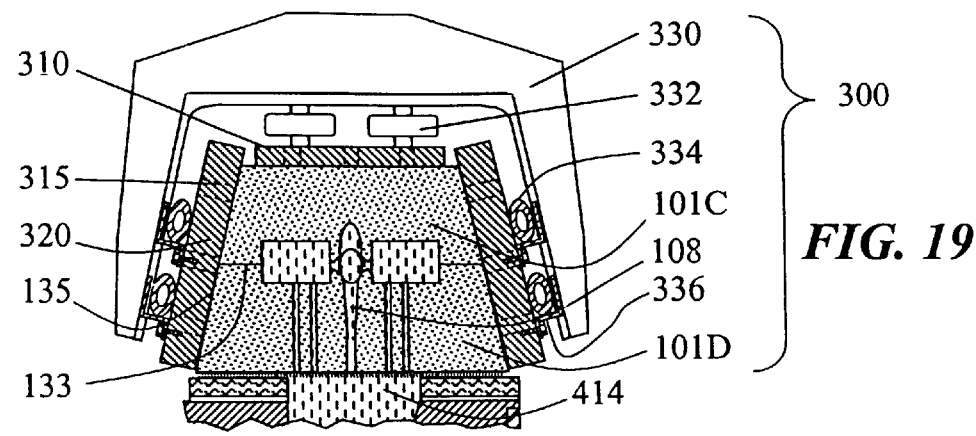
FIG. 19 is a sectional schematic of an alternative embodiment.

The top pressure plate 310 and side support plates 320 of FIGS. 6, 13 and 19 may simply be dead weights, without the yokes 330, bladders 334, and cylinders 332 of FIG. 11. The mold support/pressure restraint device 300 may be used independently of any or all other components of the subject invention. The purpose is to contain the pressure of poured or filled moving molds 101, whether filled from the bottom, sides, or top.

In FIGS. 7 and 12, a free rolling or motorized assisted movement support belt 380 of rubber or other material may also restrain internal pressures and seal the mold line 100 to the filling/feeding device 400. Drive rollers 385 may be synchronized to the molding machine's (not shown) movements. Pressure rollers 388 may be controlled by standard electric, pneumatic or hydraulic devices (not shown). The support belt 380 is cut away in FIG. 7 but of course returns by a second similar assembly 385. The end unit (not shown) thus forms a continuous loop to synchronize with the movement of the molds 101 entering from the entrance plate 230, usually under force of a molding machine (not shown).

The support belts 380 on the sides of the molds 101 and a support belt 380 on the top of the molds 101, or the preferred embodiment of FIG. 10, or other devices imagined, thus preserve mold 101 integrity until casting cavities 109 have solidified.

The side support belt 380 of FIG. 7 and the top support belt 380 of FIG. 12 may have the vent holes 315 (not shown here) or a grid work of grooves (not shown) in the surface of the support belts 380. These grooves (not shown) aid venting of mold 101 gases from the outer surfaces of the permeable molds 101. Such a grid work (not shown) increases friction and gripping of the mold line 100. This then, is an aid to assisted movement by the drive assembly 385.

In FIGS. 7 and 12, the support belts 380 may also be made of a permeable material for venting of gases, including the air contained initially in the gating 108 and casting cavities 109. This is an important subject for application to loose sand 111 molding (FIG. 22, to be discussed).

Figure 23:
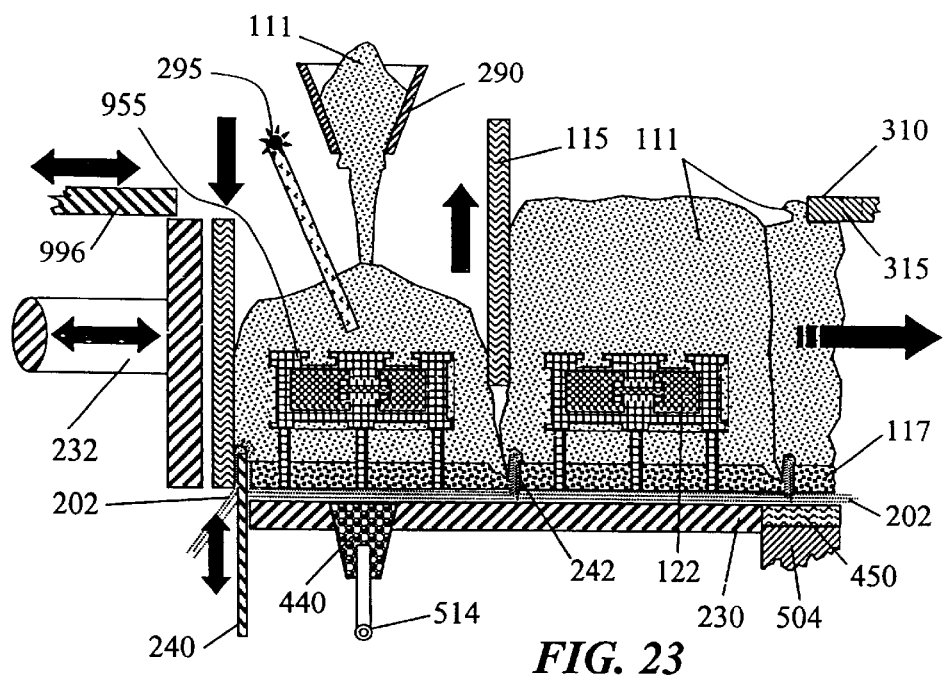
FIG. 23 is a detailed sectional schematic of an advanced embodiment.

With assisted movement, massive molds 101 and virtually unlimited lengths of mold lines 100 are pulled through the casting machine invented. Required mold strength is lessened with any combination of support plates (310 and 320) or support belts 380 or other devices to accomplish the invented process. The required strength of the molding machine (not shown) or other pushing device 232, contemplated in FIGS. 10 and 23, is less, in this more complex embodiment.

In a similar manner, oscillating rails (not shown) and other mechanical means can be imagined to support and restrain the molds 101 and provide assistance to traveling motion.

B) Alternative Filling and Feeding Chamber Shapes

FIG. 13 illustrates that the filling/feeding chamber(s) 411 may be shaped to adapt to various needs of casting and molding. The chamber 411 in this drawing reduces direct radiant heat to the bottom of the mold 101 when banked for downtime. Increasing vacuum in the space 510 pulls the metal 600 away from the mold 101 when needed for energy conservation.

Figure 15:
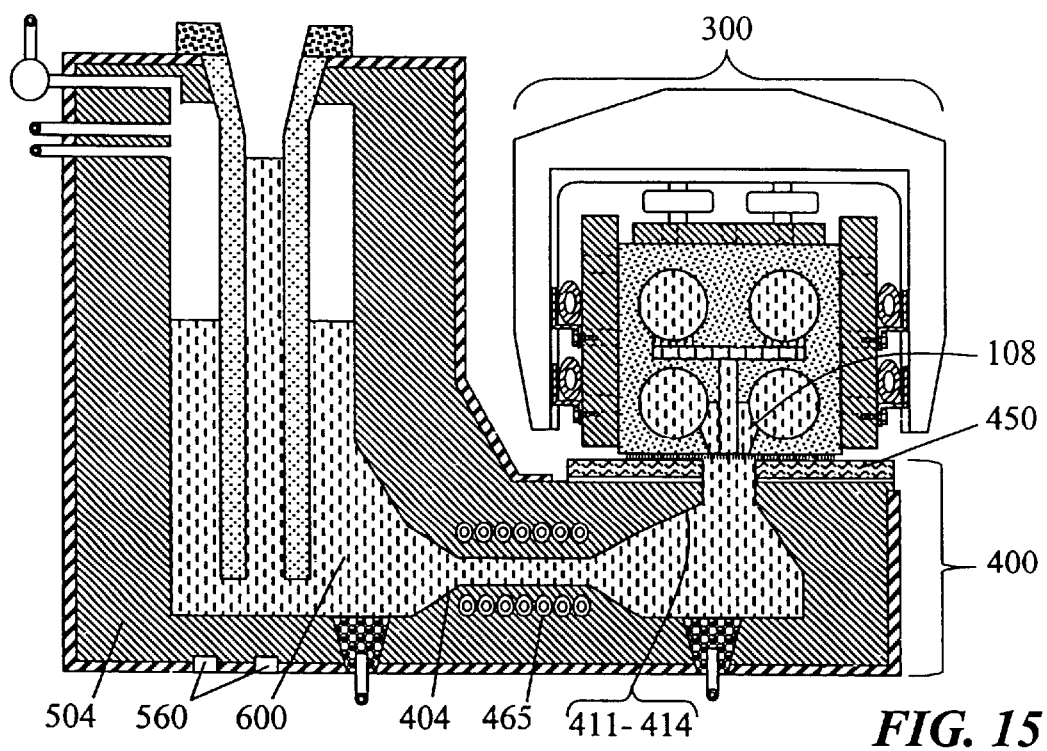
FIG. 15 is a section view (4—4 in FIG. 2) of an alternative embodiment.
Figure 30:
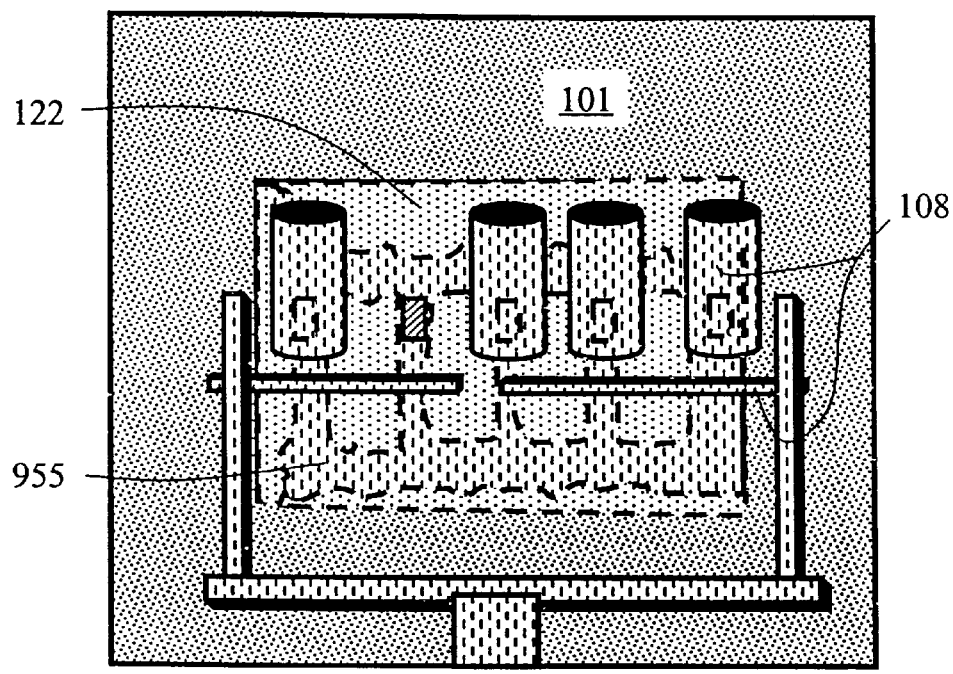
FIG. 30 is a schematic plan view of one embodiment for casting with gating cores.

A narrower chamber 411 is suggested in FIG. 15 as an alternative embodiment of the invention. Weaker molds 101, unable to bridge without sagging at start-up are thus accommodated. This is an effective way to increase the sealing of the mold line 100 to the chamber surface 450. Less consumption of filter cloth 202 is necessary in this way. In fact, filter cloth 202 may be eliminated in certain applications. An example is shown in FIG. 30.

A narrow filling chamber 412, as in FIG. 15, may control the filling path through the gating. An enlarged feeding chamber 414 as in FIG. 19 may follow to pressurize other accessible openings or gates 108 for high pressure feeding or sequential filling of top and bottom cavities 109 as in FIG. 13. The opposite approach is taken in FIG. 17, where several gates 108 take filling pressure over the filling chamber 412 but all solidification shrinkage is fed through a narrow feeding chamber 414 into the center gate 108 of the mold 101. This is ideal for cast aluminum wheels 995 in FIGS. 36–38.

By limiting the exposure to molten metal 600 with the narrow chamber 411 opening (FIGS. 15, 17 and 18), less heat degeneration of the molds 101 occurs. Also, the mold 101 weight is more capable of sealing itself. With less exposure to buoyant force, less mold supporting pressure is required but more pushing force may be necessary to convey the molds 101.

C) Alternative Filter Cloth Embodiments

By now the importance of the filter cloth 202 is clear, although it is optional in certain cases. Many embodiments of filter cloth 202 are suggested by the unified principles of this invention.

Referring to the microscopic view of FIG. 27, typical fiberglass filter cloth 202 is bridging the empty chamber 411 of the filling device 400 in tension. It must have sufficient strength for the conditions encountered. On the right, the cloth 202 is also in compression between the mold 101 and the low coefficient-of-friction surface 450 of the filling device (400 series). The cloth 202 must slide over this surface 450. The mold 101 is also in compression, slightly deformed by its own weight and from pressure of the support device (300, not shown). The width of support from the low friction surface 450 is designed dependent on mold 101 and cloth 202 properties.

Longitudinal fibers 202A of the cloth 202, in cross section, present tensile strength for pulling. They also present an effective barrier to molten metal 600 leaking across the surface 450. Friction is a function of the area of the longitudinal fibers 202A in contact with the surface 450.

The latitudinal fiber 202B of the cloth 202 presents tensile strength for bridging the empty chambers (411–416). This fiber 202B presents a parallel path for molten metal 600 to leak, slightly. As the cloth 202 crosses chamber end walls and divider walls 420 (in FIG. 22) the properties and functions of the fibers (202A and 202B) switch. Solid metal flashings 650 (FIG. 29) hold the cloth 202 together for dragging across these walls 420.

This analysis suggests improvements to the filter cloth 202 to aid performance of the casting machine invented, as necessary.

In another embodiment of this invention, the filter cloth 202 is coupled or laminated with plastic 250 (FIG. 28), either as sheet 250 or by impregnation of the cloth 202, to completely seal it. This enables vacuum bonding of the sand mold 101. The compression of multi-layered cloth 202 is seen to create an effective seal against molten metal 600 leaks in FIGS. 28–29.

The refractory filter cloth 202 may also be of sufficiently fine mesh and strength, with or without plastic 250, or other consumable material, to retain the sand of the molds 101, whether loose 111 or mixed with binder. Laminating the cloth 202 will also provide lubricity between the molds 101 and the chamber surface 450.

FIG. 29 presents the novel idea and embodiment of laminating filter cloth 202 with metal fibers, wire, or mesh 205 for increased tensile strength and reduced friction for sliding. High temperature wire dissolves in most molten metals 600 at some rate. Metal atoms 605 diffuse into the moving molten metal 600 from the dissolving wire 205. The strength and friction properties of the wire 205 remain useful over the low friction surface 450, which is bonded with adhesive mortar 452 to the refractory 504 of the filling device 400. Late modification of aluminum or other molten metals 600 with titanium wire or other alloy wire mesh 205 is thus embodied.

It is thus seen, that filter cloth 202, in many embodiments, has many more invented purposes than just trapping slag 666 (in FIG. 29). Still, the cleanliness of the metal castings, produced by the unique filtering and filling techniques invented, along with the high internal integrity, makes this invention very valuable.

D) Long Pressurized Lines with In-Series Furnace Vessels

The molten metal 600 throughput for shrinkage feeding, previously mentioned, is much lower than that required for mold 101 filling. It can be advantageously increased in the feeding vessel 502 (FIG. 12) by a uniquely efficient embodiment. Fading and loss of temperature in the molten metal 600 due to limited flow is prevented while simplifying and improving operations.

As feeding is appropriately conducted at higher pressure than filling, a metal height 505 in the feeding furnace/vessel 502 is greater than that in the filling vessel 501. The invention, then, allows molten metal 600 to flow from the feeding furnace 502 into the filling vessel 501.

Figure 16:
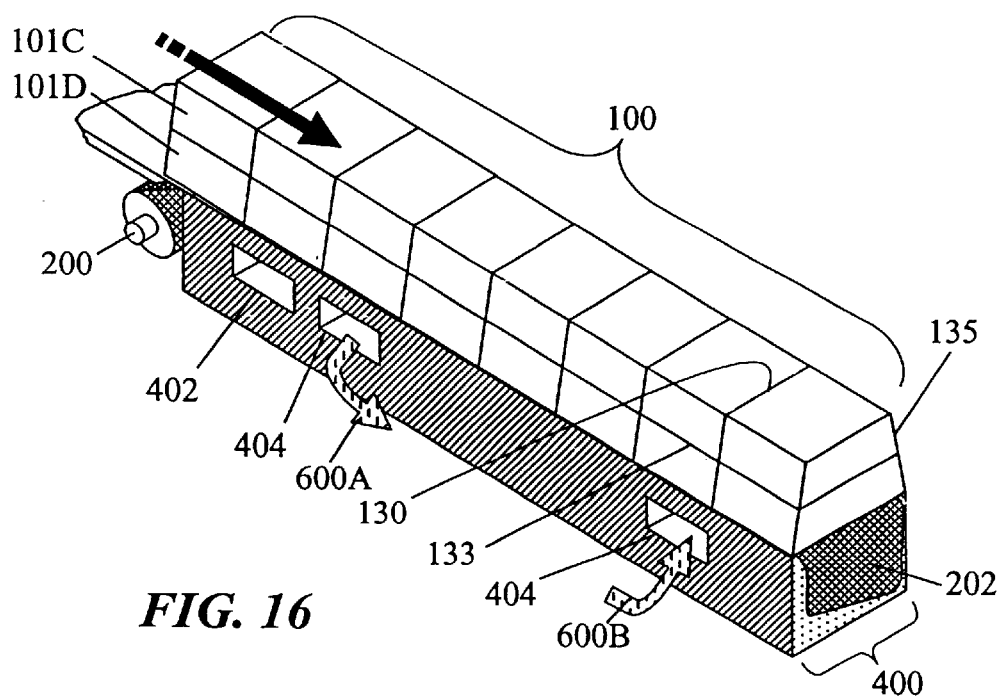
FIG. 16 is a sectional schematic perspective of alternative embodiments with holding vessel removed at 6—6, FIG. 2, and other components removed.
Figure 17:
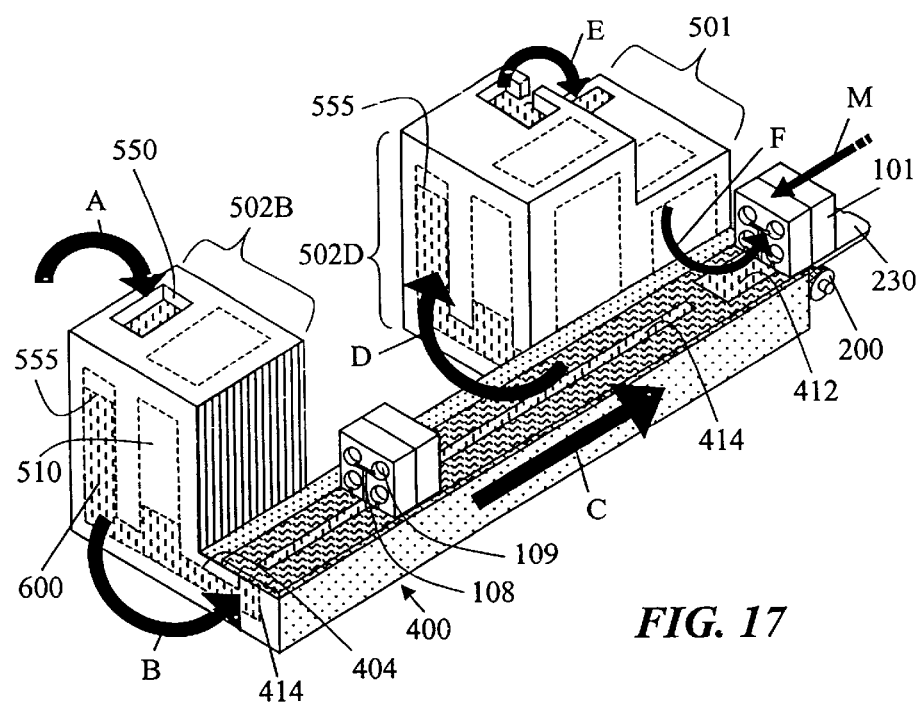
FIG. 17 is a schematic, see-through, flow diagram of an advanced embodiment of the invented process and machine.

Let us note, before we consider this process in FIG. 17, solidification may take several minutes to complete within a mold 101. To provide ten minutes of cooling and pressurized solidification to fifteen inch (38 cm) molds, produced every ten seconds (360 molds per hour), requires a feeding chamber 414 to be seventy-five feet (23 meters) long. Molten metal 600 over this distance must be heated and/or circulated by methods (465–470) mentioned with FIGS. 4, 5, 15, and 16, or by other methods imagined from the discussion.

In FIG. 17, process flow through the embodiment invented is illustrated by the molten metal 600 movement arrows A–F. Mold line 100 movement is again shown by the arrow M. Many molds 101, optional filter cloth 202, and optional mold support devices 300 are removed for clarity. The furnace/vessels (501 and 502) are modified and the schematic drawing shows certain internal features and is of the same operational techniques as embodied in the earlier FIGS. 4–5. At least two, vacuum and pressure controlled feeding furnaces (502B and 502D), in series, control the long filling and feeding device 400.

In FIG. 17, at arrow A, molten metal 600 is delivered to one efficient location far from the molding machine (not shown) and poured into the filling column/chamber 550, of the primary feeding furnace 502B. This is adjacent to the end of the solidification feeding chamber 414. The furnace filling column/chamber 550 is open to the atmosphere, at least while being filled or replenished. Heavy inert gas may be applied here to further protect the molten metal 600.

In operation, metal height 555 in the furnace filling chamber 550 is held steady regardless of volume filled, by application of vacuum or pressure in the space 510 inside the furnace 502B above the metal 600. This controls the degree of mold 101 pressurization for solidification feeding.

At arrow B, metal 600 flows through the primary furnace 502B, passes through the feeding channel 404 and into the long feeding chamber 414. The chamber 414 is covered and sealed with the molds 101, in a continuously or intermittently moving, booked mold line 100. Filter cloth 202 (not shown here) sealing may, or may not, be used.

At arrow C, the pressurized molten metal 600 flows the length of the filling device 400, via the feeding chamber 414, feeding shrinkage in the molds 101 above, through the gating 108.

At arrow D, remaining metal flows out of the filling device 400, through another feeding channel 404 (as at 600A in FIG. 16), and into the secondary feeding furnace 502D, closer to the molding machine (not shown). Here the metal rises, seeking the same level 555 of the filled primary furnace 502B. Several furnaces (502 series) may be linked this way, in series, for ultralong pressurized solidification feeding.

This secondary furnace/vessel 502D may also be vacuum and pressure controlled, identically in method, and in tandem, with the filled furnace 502B, thus providing additional metal 600 storage. However, a single pressure vessel is sufficient to drive the invention. Heating by induction or other means is recommended at this point (not shown).

Metal or liquid 600 overflows at arrow E to replenish the filling furnace/vessel 501, the operation of which has been discussed. Final flow, at arrow F passes from the filling furnace 501, through the lower pressure filling channel 402 (not shown here), into the filling chamber 412 and through the gating 108 to fill the molds 101. These filled molds 101 then pass onto the higher pressure feeding chamber 414 for several minutes of pressurized solidification feeding.

Metal 600 flow rate required, depends on mold machine (not shown) cycle time and casting cavity 109 and gating 108 volume. The feeding channels 404 and filling channels 402 may be of a size, no larger than necessary (FIG. 16), to accomplish this flow rate, driven by the head pressures involved from the height of metal 555 in the furnace filling chamber 550. If a failure of the filling device 400 sealing occurs, pressure in the space 510 above the metal in the furnace (501, 502, 502B, 502D, etc.) is immediately released. This reduces head-pressure. With lower head pressure and a smaller channel (402 or 404) opening, runout overflow is thus at a safer and more manageable rate. Much of the metal 600 is actually captured in the furnaces (500 series) in this way. Any loss may be safely collected in the previously mentioned pit (not shown).

The system is controlled automatically and remotely by computer (not shown) algorithm, requiring only infrequent checking by personnel, replenishing of liquid 600 at one location, and continuously supplying the molds. Radiant energy losses are greatly reduced as metal 600 is completely contained at all locations, excepting at arrow A. The system is quiet and safe.

E) Parallel Molding Lines

Figure 18:
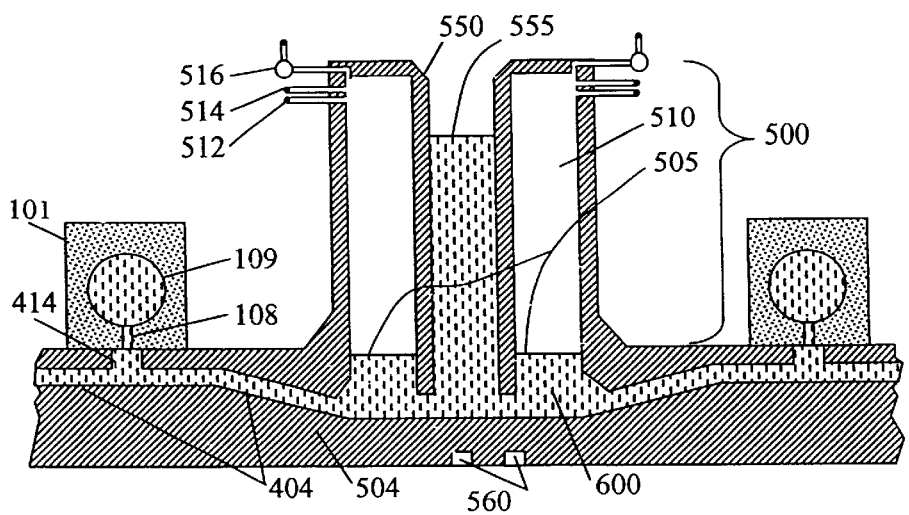
FIG. 18 is a sectional schematic of the invention showing an advanced embodiment.

FIG. 18 is largely self-explanatory, in this simplified schematic. It is a marvelous embodiment for using one furnace/vessel assembly 500 to supply multiple parallel mold lines 100 on either side or both sides. Prior art molten metal valves (not shown) may close off any mold line 100 at will. A single vessel 500 or in-series units (501 and 502, or 501, 502B and 502D) may be used, according to the previous alternative embodiment.

F) Casting In Horizontally Parted Molds

Returning to FIG. 16, the processing of multi-segment, horizontally parted cope 101C and drag molds 101D is illustrated. Such mold lines 100 are assembled from an upper mold/cope segment 101C and lower mold/drag segment 101D, booked at the horizontal parting line 133 and at a vertical parting line 130, end-to-end. The invention accommodates and suggests "stack mold" processing also with three or more assembled mold sections (not shown).

Horizontal molds are distinguished by the exterior draft 135 typically used to aid withdrawal of the molds 101 from a molding machine (not shown) or flask (not shown) when manually made. In this embodiment, the pressure restraint device 300 is modified to accommodate this draft 135, as shown in FIG. 19. With modern high pressure molding machines (not shown) and the excellent process control capabilities of modern sand systems (not shown), exterior draft may be eliminated.

Figure 20:
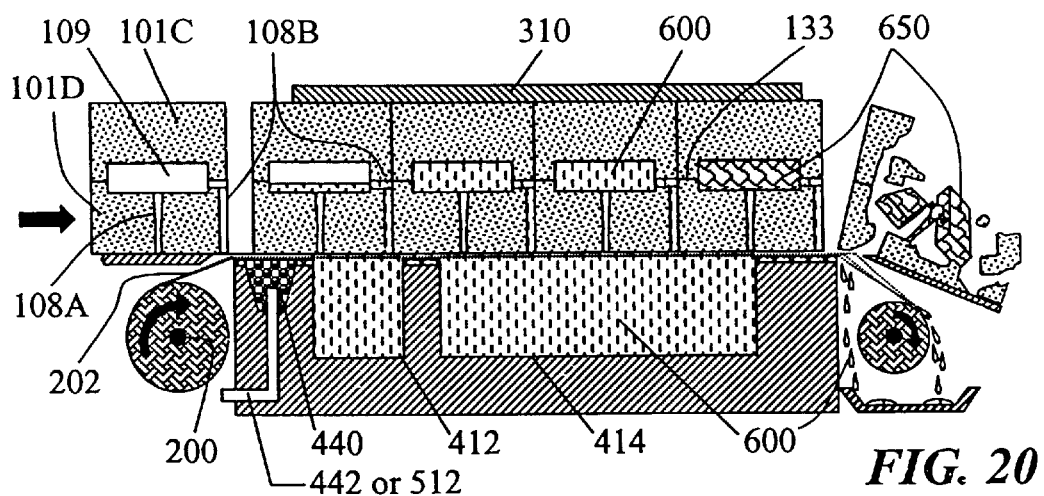
FIG. 20 is a sectional schematic perspective of alternative embodiments with holding vessel removed at 6—6, FIG. 2, and other components removed.

In FIG. 20, draft 135 is eliminated from the leading and trailing, booked and pushing, surfaces of the cope 101C and drag molds 101D. An additional, beside-the-mold, gating-system 108B is embodied between the drag mold segments 101D. Drilled or molded, through-the-mold gating 108A may be used through the drag mold segment 101D for quiescent bottom filling.

"Stack molding" benefits greatly from this method of beside-the-mold gating 108B. Automated, high speed, processing of the high yield "stack mold" method with multiple horizontal parting lines 133 is now possible. The common drilling or cutting of sprue gates 108A is not necessary.

If external mold draft 135 is required on all sides of the cope 101C and drag molds 101D by the molding machine (not shown), a method embodied in FIG. 21 is employed. The side support plates 320 seal in the track 325 discussed as an embodiment in FIGS. 13 and 14, previously. Loose sand 111 is packed between the cope 101C and drag mold segments 101D from a hopper or vibratory feeder 290 prior to entering the casting machine invented. Other equipment and methods may accomplish the functions in different ways without departing from the system.

G) Track Mold Support

Figure 14:
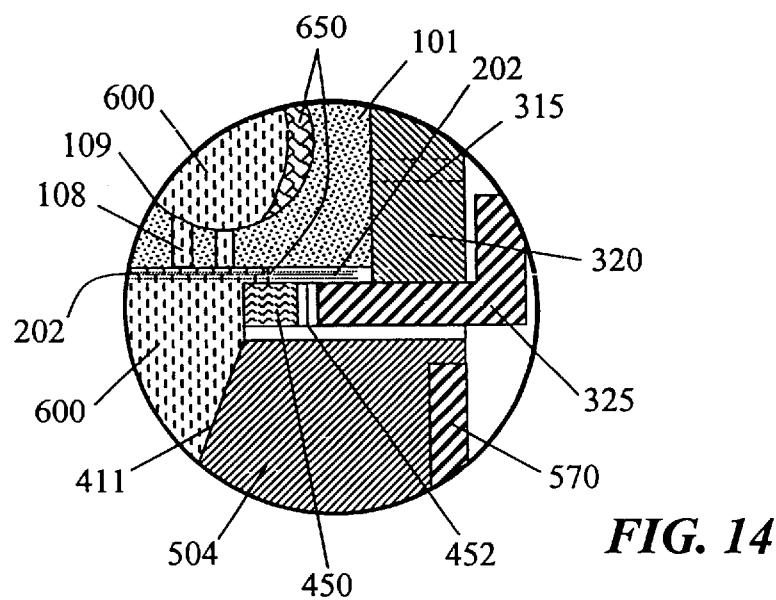
FIG. 14 is an enlarged detail view from FIG. 13.

FIG. 14 is an enlarged detail from FIG. 13, but with molten metal 600 added to the view. Looking closer at the alternative embodiment presented here, the side support plates 320 seal in a track 325. A portion of the mold 101 rides in this track 325 for increased support or reduced friction against the chamber surface 450. This foundational track 325 takes load that the top of the filling device 400 and plate hangers would normally carry. The track 325 is a firmer way of supporting the pressure support plates 320.

The primary purpose of this embodiment is to secure the system further from runouts and to retain any loose collapsing sand 111 (not shown). In fact, loose sand full molds 111 may be handled if the vents 315 are omitted. Very heavy molds 101 may be supported in this way. The track 325 may be modified with rollers (not shown) or other assisted conveying methods.

H) Extruded Loose Sand Molds for Lost Foam and Investment Casting

In the embodiments of FIG. 22, loose sand 111 molding using consumable in situ patterns, wax 110 or foam 112 or other replaceable material, or ceramic investment shells 925, hot or cold, is illustrated. Follow boards 115 of refractory material, wood, metal or other material, divide the loose sand mold segments 101 and hold the loose sand 111 as a vibratory lance 295, or other methods imagined, buries the patterns (110 or 112) or molds 101 under high density loose sand 111 in a forming chamber to create and enlarge the mold line 100. Mold solidification chills 160 or insulating materials (not shown) may be flexibly applied where needed.

The bedding in of consumable patterns (110–112 and 120), or molds 101, may be accomplished by briefly fluidizing the bed of sand 111 through the porous plug 440 or vented deck plate 230 through a pressure line 514. Filter cloth 202 is recommended and should be stitched 242 into the loose sand molds 111. The loose sand molds 111 are covered briefly by a closable forming chamber cover 996 to hold the loose sand mold 111 during extrusion. The mold support device 300 is necessary for exterior support of the extruded bed 100.

The bed or assembled mold line 100 is pushed and/or pulled through the casting machine, held securely by the exterior support plates (310–320, FIG. 13) at high production rates. The follow boards 115 prevent shear within the moving bed 100 of sand 111 but are not always necessary.

This loose sand 111 may be incredibly fine grain for exceptional detail and surface finish of the castings. Many dry, granulated and powdered minerals can be utilized as mold media 111 as an embodiment of the present invention. Low permeability sand 111 is possible with this pressurized filling and feeding method invented. A bed of coarse sand 117 may be laid first to prevent the fine loose sand 111 from sifting through the filter cloth 202.

The dispensing roll assembly 200 may be as previously shown or may be repositioned, as in FIG. 22, to completely encase the loose sand 111. With plastic sheet 250 (FIG. 28) or with laminated filter cloth 202 the air may be evacuated from the sand 111 through a porous plug 440. This produces a rock hard mold line 100, bound by vacuum.

Support plates (310 and 320, in other drawings) may be enlarged to fit together and seal, so that air evacuation of the sand 111 is accomplished without plastic sheet 250. Casting in this manner produces incredibly thin casting walls, as the molten metal 600 is literally sucked into the casting cavities through the permeable, loose, air evacuated sand 111. Environmental benefits are also achieved as mold and metal reaction products are lessened and completely contained.

The chamber 411 has first been pressurized with liquid metal 600 using high strength starter molds 101 as the initial covering of the filling device 400. The casting machine invented must first be primed, in other words, before pressurization. Then it is possible to use loose sand 111 following the starter molds 101 (not shown in FIG. 22).

In FIG. 23, the embodiment of loose sand 111 molding is shown again with bold action arrows. Here, the follow boards 115 are removed prior to mold 111 filling. The details of loose sand 111 molding have already been discussed.

In this embodiment, loose sand 111 is vibration-packed by a vibratory lance 295 around a consumable cylinder head or bedplate pattern 955 or other article. The leading follow board 115 is extracted allowing the loose sand 111 of the previous mold and the current mold to come together into one mold line 100, as previously described. The continuous loose sand mold 111 is thus extruded. Mold extruding, in any embodiment, may be used independently of any or all other components of the subject invention as alternative embodiments.

The mold extruding method of making cylinder heads and bedplates 955 is an embodiment of the subject invention, with or without, follow board 115 extraction. Other similar parts, with or without sand cores 122 are also in mind. For example, looking again at FIG. 22:

near net shape castings 915 without cores 122, such as brackets 915, are made at higher production rates;

investment shells 925, for such as turbine blades 925, may be processed at much higher speeds and with ultimate integrity;

single crystal casting can be accommodated using hot loose sand 111 passing into an enclosure (not shown) with a chilled bottom surface (not shown) and decreasing temperature as the molds 111 travel;

bulky long castings 935 such as axles 935 are made in foam consumable patterns 112 around a sand core 122 in loose sand molds 111 of variable length;

hollow-cast castings 945 will be discussed shortly;

chilled and hardened castings are easily accommodated with embedded chills 160.

The flexibility of the mold filling or casting machine invented, now largely understood, means that the drawings of FIGS. 1–38 shall be intended to illustrate any kind of molds 101 filled with any liquid 600 and the invention is not limited to the illustrations and applications provided.

I) Multi-Chamber Filling and Feeding Device

Another important embodiment illustrated in FIG. 22 is the use of multi-chambers (412, 414 and 416). The benefits of the filling chamber 412, at low or high pressure, have been largely enumerated. The solidification shrinkage feeding chambers 414 may have successively higher pressures when connected to independent pressure vessels (500–502). Early on, the sand molds (101 or 111) may not be able to tolerate high pressure liquid metal 600 without suffering penetration. (Yielding to compressive force of the liquid 600 only occurs if the compressive force of the molding machine (not shown) is exceeded according to Principle #7, above.)

As a shell of solid metal 650 grows in the casting cavities 109, higher pressures may be applied. The sand mold (101 or 111) is now protected by solid metal 650 of low tensile strength but unlimited compressive strength. It continues to behave in union with the liquid metal 600 as an incompressible fluid, as long as the sand mold (101 or 111) behind it does not yield.

This reveals the importance of the mold pressure restraint device 300. Centerline dendritic shrinkage (not shown) resists the flow of molten feed metal 600. By applying successively higher pressure over multi-chambers 414, high integrity castings are made. Automotive and aerospace aluminum castings in sand, with high strength, elongation and other improved properties, at lower costs, are achieved by the invention; system, processes, methods and equipment.

With thought, one will realize, the composition of the alloy in the filling furnace/vessel 501 is critical, but the composition in the feeding furnace may not be critical in many applications. In fact, it may be another metal altogether. Saving energy, a low temperature heavy metal in the feeding chamber 414 will push feed metal 600 already in the gating system 108 into the centerline shrinkage of the solidifying castings 650.

J) Hollow-Cast and Bi-Metallic Casting

With multi-chambers, discussed previously with FIG. 22, an atmospheric draining or vacuum chamber 416 may collect the excess liquid metal 600 from the gating 108 or even drain the centerline liquid from the casting cavities 109. In this way, after a controlled thickness of solid metal 650 freezes, a casting may be drained of the remaining liquid metal 600. The manufacture of hollow-cast castings 945 is thus embodied using the casting machine invented.

A second filling chamber 412 (not shown) after the draining chamber 416 may refill the hollow-cast casting 945 with the same or any other metal for bi-metallic castings.

K) Mold Stitching For Speroidal Graphite Irons

FIG. 24 reveals one of the most important applications of the previously discussed mold stitching 242. It is an embodiment of this invented process and system to add magnesium bearing material or rare earth metals 630 in specially designed pockets of the gating system 108, directly or indirectly above the filter cloth 202, for the controlled production of spheroidal graphite irons, whether fully ductile iron or compacted graphite iron.

Environmental benefits of the invention have been discussed. By choice of designs already embodied, venting of reaction fumes can be controlled to any degree required. Vapors associated with these alloy 630 additions and processes are thus accommodated.

The disclosed method of treating metals 600 within gating 108 pockets sealed with filter cloth 202, in any embodiment, may be used independently of any or all other components of the subject invention as alternative embodiments.

L) Ductile Iron Crankshafts and Camshafts

Figure 25:
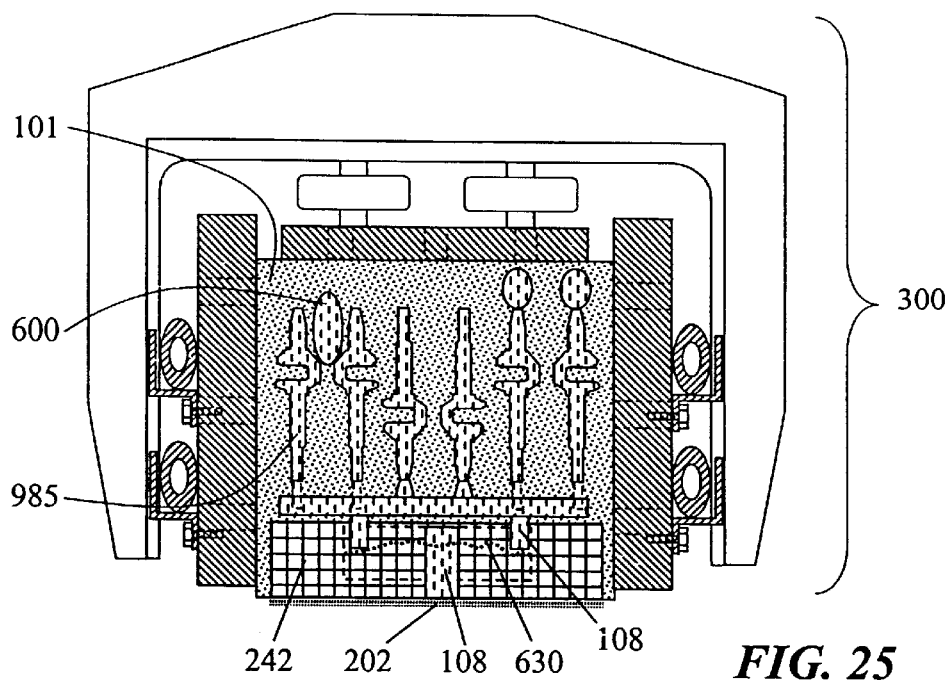
FIG. 25 is a schematic plan view of embodiments for casting of crankshafts or camshafts.

FIG. 25 is an invented method for making ductile iron crankshafts, camshafts, or similar castings 985. This method employs vertical molding or foam consumable or investment shell crankshaft patterns 985. Near net shape is possible. While ductile iron is illustrated to explain mold stitching 242, steel or other material may also be made with the invented method.

The crankshafts/camshafts 985 are risered in three ways in this illustration. The outer four crankshafts 985 employ two methods of conventional shrinkage feeding: common risering on the left and individual risering on the right. While all gating 108 methods may benefit from pressurized feeding from the high pressure feeding chamber (414, not shown here), it is not always required. A combination filling and feeding chamber (410, see FIGS. 7–10) produces excellent results also.

The middle crankshafts 985 depend upon bottom pressurized feeding after filling and the method is a primary and preferred embodiment of the invention; system, method and equipment.

Molten metal 600 rises from the filling chambers (411 or 412, not shown here) under pressure from the furnace/vessel (500 or 501, not shown here), previously discussed. It passes first through the filter cloth 202 in the normal way of this invention. Then, by design of the gating system 108, the metal 600 flows through the stitch 242 and over the bed of rare earth, alloy, inoculant, or modifier 630. The metal 600 is thus filtered twice before treatment with alloy 630. See FIG. 24 again for the side view.

With the mold 101 flooded to this controlled level, the rise in pressure may be stopped and the reaction may be allowed to subside before continuing to fill the mold line 100. This is an aspect of the batch filling process previously discussed.

For most applications and in the preferred embodiment, the mold 101 continues to fill, without pausing, under steady pressure, sufficient to completely fill the mold 101. This may be at any speed desired by design of the gating system 108. This is a huge advantage over prior art, which must pour or fill according to the cycle time of the molding machine (not shown). Quiescent, lamellar flow is enabled for maximum casting quality.

Finally, by design of the gating system 108, the treated or modified molten metal 600 flows through the stitch 242 a second time. The stitch 242, as clearly seen in FIG. 24, is a double layer of filter cloth 202. The molten metal 600 is thus filtered three times, once after the reactive treatment with a doubled layer of cloth 202 in the stitch 242. When coupled with inert gas purging of the mold 101, previously discussed, exceptional casting quality is achieved, not at laboratory speed but at high production speeds.

The space employed by the alloy 630 in the gating 108 is unused in conventional prior art. With gravity pouring methods, the top of the mold (101 or 111) is, generally, also unusable. The closeness of casting cavities, generic 109 or specific (985 in FIGS. 25 and 26), to the edge of the mold 101 in this invented method, is not as limited as in conventional methods.

The pressure restraining device 300 allows much more utilization of the mold 101 parting line surface (130 or 133 in FIG. 16). Bearing surface (130, see FIGS. 32 and 33 for side view) between molds 101 for pushing is still to be considered, but, with the power assisted, belted, mold support system and equipment 300, less parting line bearing surface 130 is needed. More castings (109 generally, 985 in this specific example) can be in the mold 101. Clearly, mold 101 utilization and yield is greatly improved by the subject invention.

Figure 26:
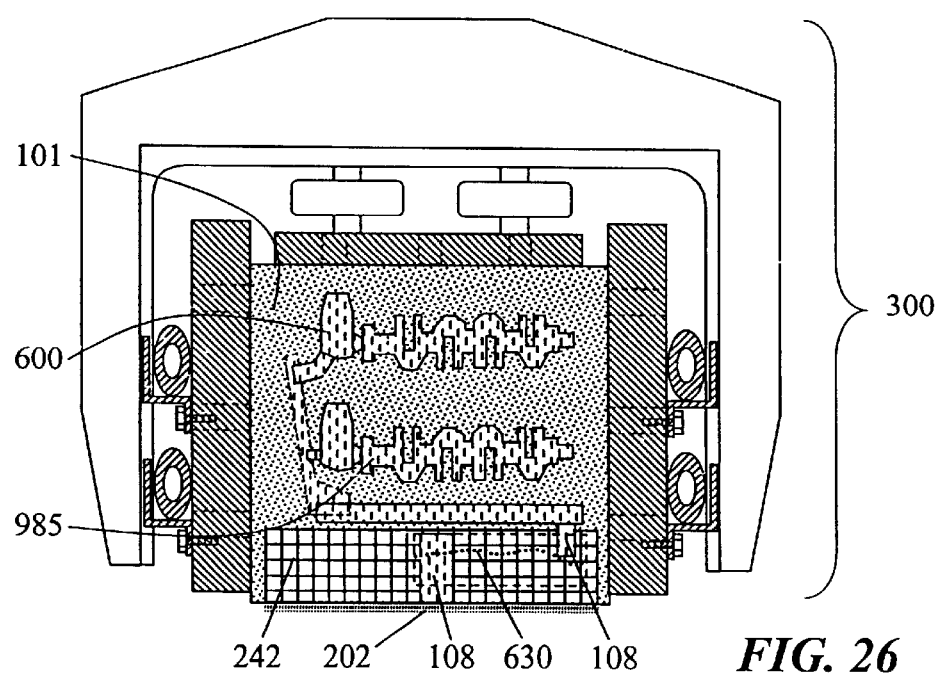
FIG. 26 is a schematic plan view of another embodiment for horizontal casting of crankshafts or camshafts in vertically parted molds.

FIG. 26 illustrates horizontal casting of crankshafts, camshafts, or similar castings 985 in a vertically parted mold 101. Persons skilled in the art will see that the metal 600 takes a single path over the alloy 630. The metal 600 was divided into two routes in FIG. 25. By various designs it is possible, with mold stitching 242, to filter the molten metal 600 numerous times for ultimate cleaning.

M) Gating of Automotive, Truck, and Industrial Castings

FIG. 30 illustrates a method of making cylinder heads, bedplates, bearing caps, and other similar castings 955 with a gate or package core 122 in vertical green sand molds 100. The gating 108 is pressurized according to the invention, for filling thin walls. Large gates 108, that stay molten a sufficient time, reach into and feed the isolated heavy sections under pressurized feeding, according to the invention. For improved yield, these gates 108 are drained, in the preferred embodiment, after solidification of the casting. Using a chamber 414 design as in FIG. 15, filter cloth 202 is eliminated as shown here in FIG. 30, or reduced to a narrow strip of filter cloth 202 similar to that in FIG. 35.

Figure 31:
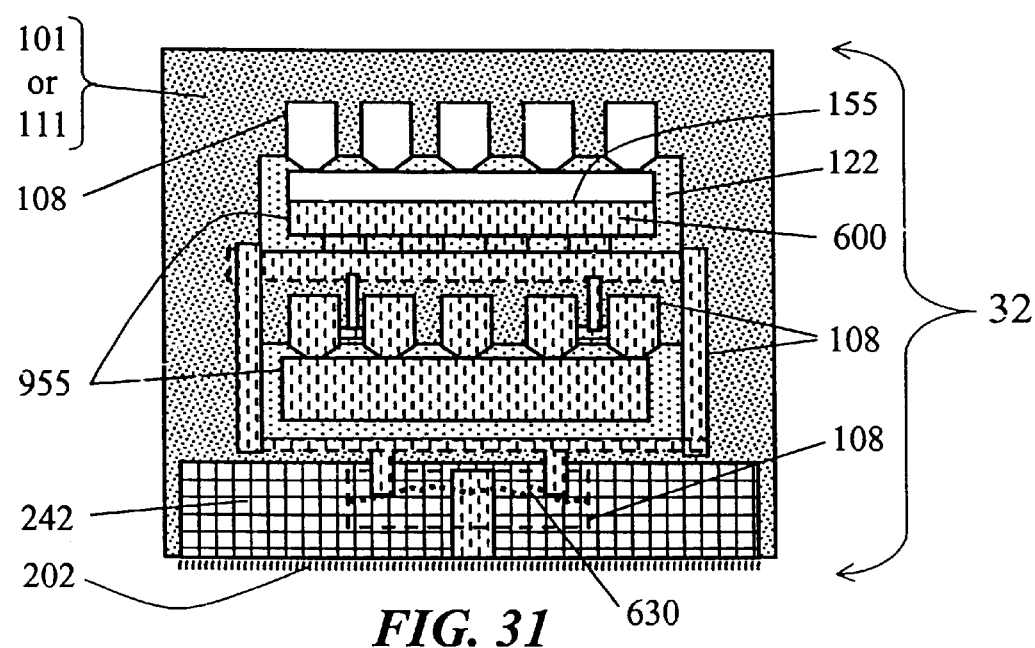
FIG. 31 is a schematic plan view of another embodiment for casting cylinder heads, etc. with stitched filter cloth binding molds and modifiers.
Figure 32:
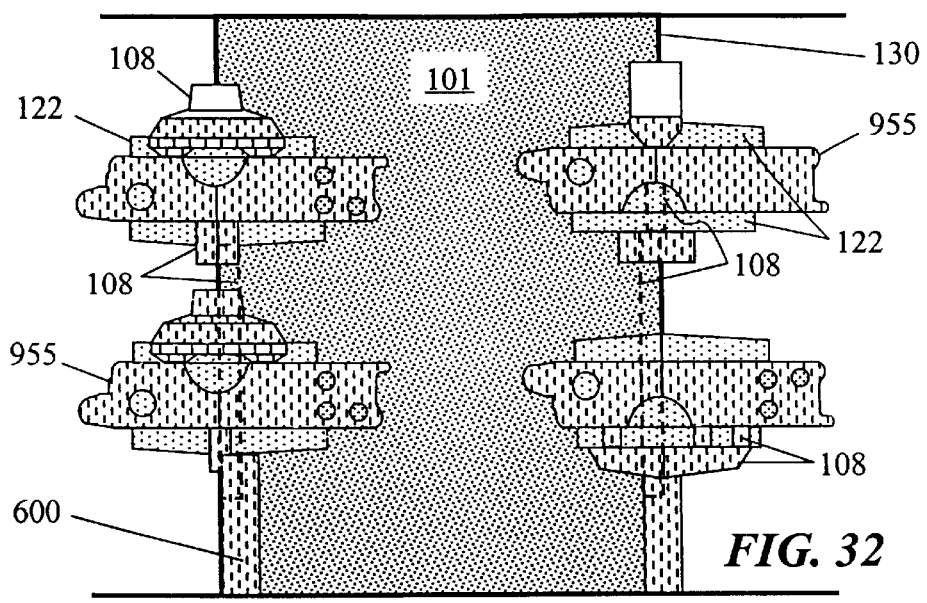
FIG. 32 is a schematic drawing of a side view of several embodiments for casting cylinder heads and bedplates.

FIGS. 31 and 32, front and side views, show an alternative embodiment for making cylinder heads, bedplates and other similar castings 955. Here they are cast in the horizontal position in a green sand, vertical mold 101 using a package core 122. Two cavities 109 or more are possible in this method.

Loose sand molds 111 may use the same methods FIGS. 25–38 detail, as additional embodiments of the invention. The package core 12-2, when completely closed, may be void in its casting cavities (109, not shown here). Meltable metals, papers, or other consumable materials (not shown), seal the gates 108 and keep the loose sand 111 out of the package core 122. Alternatively, the core package 122 may be filled with foam (112, not shown here) or other replaceable material.

The upper casting 955 in FIG. 31 is shown in the process of filling. It is bottom filled while the lower casting 955 is top filled to illustrate the flexibility of the system.

Both castings 955 are conventionally risered by the gating 108 through the core package 122. Riser gating 108 may be eliminated with some designs when using pressurized solidification according to the invention. This is shown in the lower right of FIG. 32.

In FIG. 31, mold stitching 242 is employed for alloy 630 additions, or other reasons previously discussed. In mind, is magnesium 630 treatment of molten iron 600 for compacted graphitic iron which is very desired in cylinder heads, bedplates and other castings 955. Prior art has difficulty keeping the molten metal 600 clean, feeding the shrinkage porosity and controlling the composition and graphite morphology (shape). The invention handles these issues easily at low cost.

Similarly, the illusive goal of sound, high-molybdenum, cylinder heads 955 is embodied and easily accomplished by this invented system, method and equipment. Production of such castings is imagined and illustrated in FIGS. 10, 12, 19–21, 23, and 30–32.

FIG. 32 is a side view of FIG. 31 but without mold stitching 242. Also, the cylinder heads, bedplates, etc. 945 are inverted on the right. The left side uses riser gates 108 with access by two connection gates 108 bridging and passing through the gate core 122. Bearing caps 945 can also be imagined in either embodiment.

FIG. 32 in addition shows various methods to riser gate 108 cylinder heads, bedplates and similar castings, including feeding by pressurization from the chamber (410 or 414) using no riser gates in the lower right.

Figure 33:
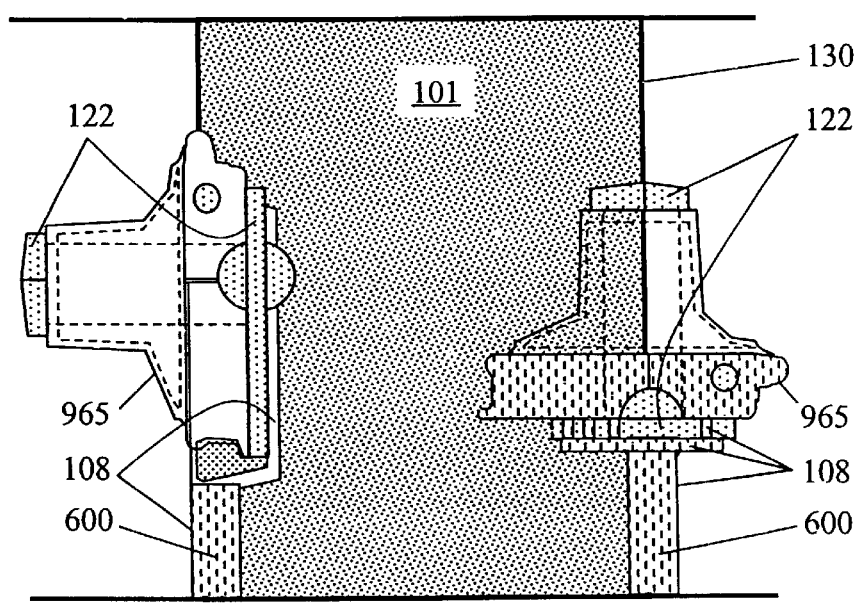
FIG. 33 is a schematic drawing of a side view of several embodiments for casting engine blocks.

FIG. 33 shows similar methods applied to engine blocks and similar housings 965. Both FIGS. 32 and 33 are in process of filling.

O) Cores for Gating and Feeding

This section elaborates further on the gate core 122 methods of FIGS. 31 and 32 with additional embodiments of the invented processes and methods.

FIGS. 34 and 35 show two methods of making truck and automotive wheel hubs 975 or any heavy section casting 975 with thin section perimeters. A sand core 122 embodied, reaches across the thin perimeter of the hubs 975 allowing the gate 108 to access and contact the heavy section of the casting/hub 975.

FIG. 34 shows how this would look using individual riser gates 108. The castings/hubs 975 have filled in this view and the riser gates 108 are in the process of filling, nearing completion. Slow gentle filling is a hallmark of the invented process while the mold line 100 proceeds at high speed.

FIG. 35 shows the use of a common gate core 122 and pressurized bottom feeding. This is the preferred embodiment. Much of this feed metal 600 may be drained when the casting 975 is solidified.

FIGS. 34 and 35 also employ mold stitching 242 for alloy 630 additions. The filter cloth 202, of course, coats the bottom of the mold 101 also. By using a narrow design for all chambers (410–416), similar to that described in FIG. 15, much less stitching 242, and/or consumable filter cloth 202, is required, as shown in FIG. 35.

SUMMARY OF THE DESCRIPTION OF INVENTION

Vertically parted molding machines presently approach 500 molds per hour. A vertically parted type mold 101 is shown in FIGS. 1–15 and others. Horizontal molding machines cannot achieve such rates because they require individual processing, usually with a mold flask and mold weights. Horizontal molding is shown in FIGS. 16, and 19–21. Neither process achieves the integrity or quality of investment casting or full-mold, loose sand molding, such as lost-foam casting. Such processes, utilizing the techniques of the invented casting machine, are shown in FIGS. 22 and 23. The invention is not limited to any particular type of molding, however.

Traditional or modern pouring and filling methods must complete the operation within the short molding cycle time. Such rapid pouring or filling violates fluid flow principles for lamellar, non-turbulent flow. Scrap rates are excessive and elaborate methods to filter or fill the metal often raise the cost of casting.

The invention solves this problem by filling during movement of molds. The novel invention described actually operates simply and with very few moving parts. The system is quiet and contained.

At extreme quality requirements, molds must be of fine media with low permeability and thus require pressurized filling. Such molds currently require elaborate set-up and do not achieve high production rates. Pressurized, solidification shrinkage feeding has also been identified as necessary for finest dendritic grain structure, essential for high elongation, ultimate strength, aluminum castings. Again, high cost, slow production is a problem.

The invention achieves pressurized filling and pressurized solidification of moving molds, at selectable and different pressures, consistently controlled. The quality of high speed casting is improved and the speed of high quality molding is increased.

In non-ferrous casting, metal pumping techniques have been strenuously investigated. The on-going scourge of entrained metal oxides is often, if not always, aggravated by pumping. Certain de-gassing techniques are also harmful and could be eliminated by limiting metal exposure to air in transfer operations. Prior art filtration has been of limited success and requires manual setting of filters in many cases.

The invention uses gravity on a liquid column controlled by pressure, bottom filling, and a novel filtering technique that is completely automatic. Coupled with the ingenious furnace replenishing system, metal is gently contained and protected. Offering extended pressurized solidification, with flexibility for all molding techniques and media, the casting machine is the ultimate solution for cost and quality control of high-volume or low-volume, ferrous and nonferrous castings.

The benefits are applicable to plastics and other polymers whether thermally or catalytically hardening. Any hardening fluid may be molded according to the invented system, process, method, and machine.

Alternative embodiments of the present invention include the continuously pressurized filling of moldings of thermosetting polymers, plastics, resins, and such like materials, or catalytically transformed liquid chemicals, compounds, or elements, or any hardening liquids of any type in any type mold, according to the description above or that imagined thereby.

According to the present invention, in the preferred embodiment, a mold filling or casting machine is primed with molds 101 riding on filter cloth 202 over a chamber 412 of pressurized liquid 600. In production, in the preferred embodiment, casting molds 101 continue moving, with or without filter cloth 202, while the gating system 108 controls flow. A vacuum and pressure controlled furnace/vessel 500 provides a steady filling pressure, as high as necessary for high quality results. Slow filling speeds are now possible at high production speed. The gating 108 and the length and width of the filling device 400 may be designed for any size mold 101 and any desired filling speed.

The length of the filling chamber 412 is dependent upon the speed of the molding machine (not shown), the amount of liquid or molten metal 600 to be cast, and the fluid flow restraints imposed by the gating system 108.

The length of the transformation or solidification shrinkage feeding chamber 414 is dependent upon the speed of the molding machine (not shown), the section thickness of the casting cavities 109, and the thermal capacity and conductivity of the molds 101.

In the present invention, the liquid 600 rises through filter cloth 202, flows through the gating system 108 and is initially in contact with the mold 101 within the casting cavity 109.

In sand cast metals, by heat conduction into the mold 101 media, a thin shell or film of solid metal 650 is allowed to form in the casting cavity 109 before it passes over the solidification feeding chamber 414. This film of solid metal 650 now seals the sand wall of the mold 101 against further defects. At this point, the higher pressure of the second molten metal holding furnace 502 is applied through the channel 404 forcing solidification shrinkage feed metal 600 from the chamber 414 through the filter cloth 202 and up the properly designed gating system 108 and into the interdendritic voids forming in the solidifying cavities 109. High integrity castings result.

By increasing the number of pressurized solidification chambers 414, it is possible to consecutively build thicker and thicker solid walls in the cavities 109 so that pressures can be increasingly resisted to the point that final centerline shrinkage of semi-solid metal is done with applied, pressurized, liquid feed metal.

In high-pressure molding, green sand 101 is squeezed under great hydraulic force to form very hard sand molds 101. Vacuum and vibration packed loose sand molding 111 may be even harder. The liquid metal 600 could theoretically reach this same pressure under which the molds 101 were made, without further compacting or yielding of the sand mold 101. Liquid metal 600 could, however, penetrate the sand (101 or 111) at such pressures.

By filling at moderate pressure and waiting for a solid shell of metal 650 to form, higher pressure can be applied in a second operation, so that final centerline solidification shrinkage is fed with higher pressure, creating extremely high-integrity castings (900 series). An invented mold support/pressure restraint device 300, in several embodiments, prevents loss of pressure or rupture of molds (101 or 111) from such pressures.

It is no consequence that the shell of solid metal 650 is of low tensile strength at this elevated temperature. The shell is in compression between the hard mold 101 and the high pressure liquid metal 600 at the casting cavity 109 centerline. The pressure through the filter cloth 202 from the feeding chamber 414 is applied by a controlled height 555 of liquid metal 600 in a vacuum and pressure controlled feeding vessel 502.

Certain heavy section castings such as hydraulic cylinder heads and large bearing blocks may require longer solidification times than the invention can give. These still benefit from controlled, slow filling. The novel invention of mold-stitched alloying, between molds, whether vertical or horizontally parted, may also be used with such castings for ultimate alloy recovery, consistent chemistry control, and environmental benefits. Application to crankshafts and camshafts is shown in FIGS. 25 and 26.

Thin section, cored castings, such as manifolds, turbochargers and cylinder liners, may not require pressurized solidification but they benefit immensely from the invented pressurized filling system. Thin wall engine blocks, bedplates and engine cylinder heads are requiring higher performance alloys. The casting machine enables the new treatment method of mold stitching and with pressurized solidification, not only fills the thin walls but feeds the thick sections, even in high molybdenum irons. Such invented methods are detailed in FIGS. 19–2-1 and 30–33.

Pistons and other parts often have a severe mix of thin and thick sections. This invented process handles the extremes of such challenging parts at quality levels and costs previously impossible. Rotors, drums and hubs have degrees of mixed section size and must be produced at high speeds. The invention has embodiments of methods for these parts in FIGS. 4, 5, 11–15, and 34–35.

Highly popular alloy wheels may now be produced economically in high-speed, vertical, sand molding using the invented casting machine and process. The invented method is detailed in FIGS. 36–38.

The above described invented system, processes, equipment, devices, techniques, and methods, in any embodiment, may be used independently of any or all other components of the subject invention, as alternative embodiments.

Certain changes may be made in the above described system, processes, equipment, devices, techniques, and methods, without departing from the spirit and scope of the invention. It is intended that all matter contained in the description thereof, or shown in the accompanying drawings, shall be interpreted as illustrative and not in any limiting sense.

Conclusion, Ramifications and Scope of Invention

The invented system, machine and methods described greatly advances the science of molding and casting. Energy, environmental, and safety benefits are realized while cost advantages accrue to users making high integrity parts, often with enhanced physical properties. Molds may be filled with any hardening fluid imagined for any industry by the invented method. Automotive tires as well as cast wheel rims are imagined by the inventor. Chocolates and other hardened liquid foods are also imagined.

FIG. 22 is a very important drawing showing the tremendous flexibility of the casting machine and system invented. Many embodiments are illustrated or imagined from this drawing.

Firstly, short run jobbing work, even single pieces, is economically assembled into a mold line 100 with other types and lengths of molds 101. Horizontal molds and stack molds (101C and 101D, not shown here) and vertical molds 101 (not shown here), and even loose sand molds 111 may all be assembled together into one mold line 100.

This is absolutely an incredible system! An older foundry, using manual jolt squeeze molding, for instance, may place small cope 101C and drag molds 101D on the sheet of filter cloth 202, bury them in loose sand 111, eliminating individual flasks (not shown), and then continue with other sizes, shapes and types of molds, gathered from locations across the foundry into one central filling area. The number of metal transfer ladles (not shown) and transfer distances are thus reduced. Metal temperature is conserved and controlled, with energy conservation and environmental benefits.

The drawings depict a METAL CASTING OPERATION in the preferred embodiment, and FIG. 17 shows DETAILED ADVANCED OPERATION.

To start the process, referring to FIGS. 7–10, the filter cloth 202 is inserted between the first and second molds 101 to firmly grip the cloth 202. This may be done manually. The mold line 100 is indexed, or cycled, moving one mold 101 length and pulling filter cloth 202 from the dispensing roll 200 so that the completed mold line 100 does not slide across the cloth 202, but succeeds in dispensing cloth 202 and coating the bottom of the molds 101.

A certain number of molds 101 are booked in advance (not shown) of the filling device 400. The weight of these extra molds 101, more than the number shown, plus the effect of the restraining device 300, must be sufficient to prevent molten metal 600 pressure from pushing molds 101 back toward the mold deck plate 230 and the molding machine (not shown). Such a failure would open up the booked mold line 100 over the filling device 400.

In this state at start-up, molds 101, with filter cloth 202 as a moving seal, are pushed across the filling device 400 to form the tightly booked line of molds 100 and seal the chamber 411 by their own weight and/or with pressure restraint 300.

In FIG. 4, vacuum is then released from the space 510 in the furnace/vessel 500. The height of metal 505 in the furnace/vessel 500 falls and the height of metal 555 in the ceramic filling column 550 rises so that each are at equal height. This transitional state at normal atmospheric pressure is not shown.

From FIG. 5, if sufficient metal 600 is in the furnace/vessel 500, the metal 600 flows through the connecting channel 401 and the height of metal 455 (FIG. 13) in the chamber 411 rises to an equal level of that in the column 550 and furnace/vessel 500. If an additional sufficiency of metal 600 is in the furnace/vessel 500, or if the pressure line 514 is applied in the space 510 above the metal 600, the metal 600 rises through the filter cloth 202, flows up the gating system 108 and fills the casting cavities 109 or replaceable shapes in the molds 101 that are currently bridging the filling/feeding chamber 411. The height of metal 155 (in FIGS. 10 and 11) in the molds 101 rises to an equal level 555 as that in the filling column 550 unless limited at the point the mold 101 is full, as desired.

To recap, referring again to FIGS. 4 and 7, once the filling device 400 is completely covered with these high density, high strength molds 101, or other starter blocks which can be imagined, then, the furnace/vessel 500 line vacuum 512 is released. The combination filling/feeding chamber 411 is filled and pressurized with molten metal 600 from the elevated column 555. The liquid pressure tends to lift the molds 101 and provide support, aiding conveyance. The metal 600, even of magnesium, is of higher density than a porous media mold 101. The molds 101, whether of high or low strength, are thus supported by the bath of molten metal 600 in the closed and pressurized chamber 411. The molds 101 literally float over the chamber 411, as well as ride on the low friction chamber surface 450, perhaps of graphite or porcelain ceramic.

At start-up, the filling of the molds 101 is variable as the vacuum is released and/or pressure is applied until a steady state is achieved. The entire mold line 100 over the chamber 411 is being filled simultaneously. The mold line 100 may then begin continuous or intermittent advance.

FIG. 12 depicts a DETAILED, STEADY STATE, PRODUCTION OPERATION.

In the preferred embodiment of steady state processing, usually, one mold 101 is filled at a time as it moves over the filling chamber 412 (FIG. 12). Previous molds 101 are already filled and are in process of solidifying. Newer molds 101 on the mold deck plate 230 are queued up for filling and provide weight resistance to the mold line 100 preventing backing up under molten metal 600 pressure inside the molds 101 over the filling device 400.

The gating system 108 can restrict the filling such that two or more molds 101 may be at different stages of overlapping filling. This is subtly seen in FIG. 33, where the engine block casting 965, on the right, is ahead in filling. In this way, filling time is not limited or dictated by molding machine (not shown) cycle time. Thus, quality is improved with the proper filling time. Neither is cycle time limited, allowing the molding machine (not shown) to operate at maximum production rates, not waiting on molds 101 to fill. It should be kept in mind that choking the gating 108 to control filling may also limit shrinkage feeding ability. Thus, lower pressure, larger gating 108 is normally preferred.

A separate vacuum tank (not shown) connected by a valve (not shown) to the vacuum line 512 is the preferred embodiment for rapid evacuation of the furnace/vessel 500 as needed, if a leak occurs at the filling/feeding chamber 400 or if the furnace/vessel 500 is overfilled, generating excessive pressure on the molds 101. This allows a way to distance the vacuum pump (not shown) from direct radiant heat and allows time to generate vacuum to be used at start-up or when needed.

The filter cloth 202, with or without modification of the edges, forms a seal between the mold line 100 and the chamber surface 450 preventing leaks or loss of pressure from the chamber 411. The molds 101 are expected to have some amount of heat resistance to spalling and heat disintegration. The filter cloth 202 is intended, however, to provide additional support to the molds 101, whether of sand or other material. To fail, the molds 101 would bulge with the filter cloth 202 into the molten metal 600. This is resisted for a sufficient time by the hot strength of the mold 101, the stretched tensile strength of the cloth 202, the buoyancy of the metal 600, and the hydraulic pressure of the contained liquid metal 600, such that, even loose sand 111 (or coarse bed sand 117 in FIGS. 21–23) may flow through the invention after priming the unit with solid starter block molds 101.

FIG. 13 could depict a BATCH PROCESS OPERATION or a banked and shutdown condition.

In batch processing, the molds 101 remain stationary over the chambers (411–416) until fully or partially solidified. As the surface of the casting cavities 109 cool into solid metal 650 (FIG. 14) the pressure is increased by adding liquid metal 600 to the furnace/vessel 500 and/or by increasing gas pressure in the space 510 above the liquid metal 600 (FIG. 5). The pressure restraint device 300 is to contain the top and sides of the mold line 100. The high density molds 101 can resist compression to a great degree but they must not be allowed to rupture by shear stress or to float out of seal with the chamber surface 450 of the filling device 400.

Figure 38:
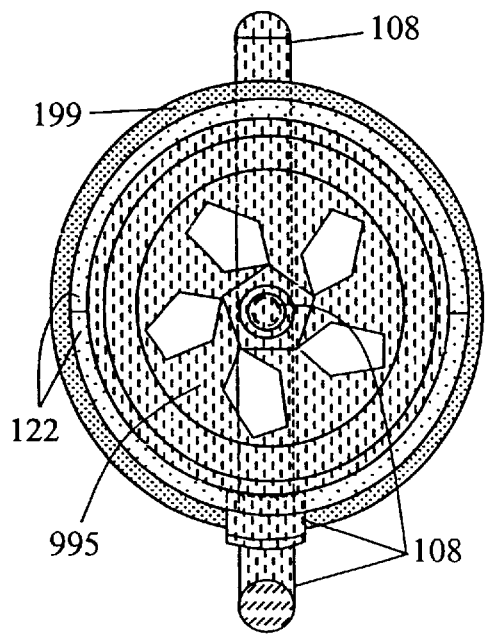
FIG. 38 is a front view of FIG. 37, of automotive wheels with cores and gating in the preferred embodiment.

FIGS. 36–38 depict the preferred embodiment of CAST ALUMINUM ALLOY WHEELS ON THE HIGH INTEGRITY, HIGH SPEED, CONTINUOUS, PRESSURIZED, CASTING MACHINE.

FIG. 36 will now finalize the description of the preferred embodiment of the casting machine invented with application to the manufacture of cast aluminum alloy wheels 995. The invention is not intended to be limited to aluminum alloys only. The vacuum and pressure controlled, filling and feeding furnace or vessel 500 is omitted from this figure and discussion, as being fully documented already, although not limited to the embodiments illustrated. The method and system are embodiments of the invention. The purposed system may be accomplished in other ways imagined from the discussion and drawings.

In FIG. 36, a pattern plate 270 on the pushing platen 232 of a molding machine (not shown) forms the casting cavities 109 of automotive wheels 995 in the mold 101. The plate 270 ejects the mold 101 from the mold machine (not shown) to book it to the mating previous mold 101 and pushes it (and other molds, not shown) across the steel plate 230. The matching casting cavity 109 was formed by a separate swinging pattern plate (not shown) in the molding machine (not shown).

The pushing platen 232, using the pattern plate 270 for thrusting, now pushes or indexes the entire mold line 100 through the casting machine, a distance of one mold 101 length per cycle.

In the preferred embodiment, the filling device 400 is designed with at least two separate chambers (412 and 414) and two separate channels (402 and 404). These are connected to the vacuum and pressure controlled, molten metal 600 supply vessels (501 and 502), not shown but previously discussed. The chambers (412, 414 and others optional), may be designed according to FIGS. 15 and 16, for conservation of filter cloth 202 (more narrow), and for heating and gentle stirring of the molten metal 600 by electric induction coils 465 or by submerged ceramic burner tubes 470 (as shown in FIG. 36).

The gentle circulation is shown in FIG. 16 by the warm metal arrow 600B and the cooler liquid return arrow 600A. This is important in certain applications as the throughput in the feeding chamber 404 may be only five percent of the throughput in the filling chamber 402, dependent upon the shrinkage properties of the material cast.

This figure also illustrates that horizontally parted 133 wheel molds (101C and 101D, cope and drag) with draft 135, or other parts imagined, may be processed over the filling and feeding device 400, with or without mold support 300 (not shown).

Returning to FIG. 36, the assembled mold line 100 with inserted cores (122 and 199, FIG. 37) slides across the mold deck plate 230 and grips the filter cloth 202 dispensing it from the roll assembly 200. The molds 101 may then be purged by porous plug 440 with the inert gas line 442 or vacuum line 512. The metal 600 may also be purged in the filling chamber 412 by a submerged porous plug 440.

The cloth may be laminated with metal wire 205 (FIG. 29) for strength, for low friction sliding on the chamber surface 450, or for modification, with titanium for instance, the wire atoms 605 dissolving into the melt 600. Mold stitching 242 (FIG. 24) may also be used for extra filtration or alloying or to better grip the cloth 202.

As the mold line 100 advances, either continuously or intermittently, the molds 101 pass over the low pressure filling chamber 412. The metal 600 rises through the filter cloth 202 and the gating 108 according to fluid flow design principles.

The filled molds 101 cross the chamber divider walls 420 sealed by the filter cloth 202. By designing the length of the filling chamber 412 to compliment the speed of advance of the mold line 100 and the molten metal's 600 temperature, the wheels will develop a predictable solid 650 skin to protect the sand mold 101. The higher pressure of the feeding chamber 414 is now safely applied to feed dendritic shrinkage and achieve high strength and elongation in wheels 995 with good to excellent surface finish.

The gating system 108 is liquid as it crosses the walls between chambers (412 and 414) and does not inhibit mold line 100 travel. A portion of the gating 108 thus empties as it exits the casting machine invented, seen in FIG. 10. This is captured in ingot molds 820 before the shakeout pan 880 or before entering an extended mold 101 cooling system (not shown).

After solidification is complete, the molds 101 move into optional extended cooling conveyors (not shown) and on to a shakeout pan 880, vibrated or oscillated by-electric-motor (not shown).

FIGS. 37 and 38 will complete the description of the method invented for the manufacture of cast aluminum alloy wheels 995. The purposed method may be accomplished in other ways imagined from the discussion and drawings. Vertically parted, green sand molds 101 are in mind but loose sand molds 111 are just as practical.

Generic wheels 995, so to speak, may be produced with normal core sand 122 at the required strength with the casting machine equipment invented. Highly popular esthetic wheels 995 can also be made using special purpose facing cores 199. These may be fine grained silica, with or without a core wash or coating (not shown). Olivine, zircon or other minerals may be used. Semi-permanent cores 199 of graphite or other material may be used. Even reusable metal dies 199 may be used as the special purpose core 199 riding inside the molds (101 or 111).

This special purpose core 199, for esthetic appearance, or for rapid, high quality, chilled solidification, is of one piece construction, in the preferred embodiment, forming the face for two wheels 995. The common gating 108 is either drilled, machined or formed by mandrels, through the special purpose core 199. At shakeout 880 the gating 108 breaks from the wheel's 995 center hub and the hub of the wheel 995 is later drilled out, leaving no marks from the gating 108.

The outer rims of the wheels 995 are formed by at least two identical conventional cores 122 of high quality. The bulk of the inside of the wheels 995 is formed by the economical mold sand (101 or 111). The early solid metal shell 650, discussed elsewhere, protects the surface finish sufficiently from the higher pressure over the feeding chamber 414.

The cores (122 and 199) may be bound together by a replaceable material as a consumable pattern such as hardened foam 112 (not shown here). This enables loose sand 111 molding or speeds the core (122 and 199) setting and the mold 101 assembly.

Access for filling may be a lower rim gate 108 for completely gentle, bottom filling of the wheels 995. By multiplying this assembly (FIG. 38), four wheels 995 may be made in a mold (101 or 111), at four wheels 995 per cycle of the molding machine (not shown). With high speed vertical green sand molding machines (not shown) at two hundred fifty molds per hour, this could net one thousand wheels per hour.

I claim:

1. A method of filling a plurality of molds, said molds of one or more types, said filling with one or more liquids, while said molds are in any speed of largely continuous or intermittent conveyance by a conveying means, in a line of said molds, wherein, said filling of said molds is by means of filling devices, each of said filling devices having one or more chambers containing said liquids, said chambers having one or more openings and said molds having one or more access openings for said filling, said access openings being on any exterior surface of said molds, said liquids under pressure by a pressurizing means, comprising:

a) forming at least one line of at least one type of said molds by a forming means,
 b) conveying said molds by said conveying means with the trailing-end of each mold in close relation to the leading-end of each following mold in said line of said molds,
 c) aligning said access openings of said molds in said line, for a time, with any number of chamber openings in at least one of said filling devices,
 d) sealing around said access openings between any exterior surface of said molds and against any one of said filling devices, by any sealing means,
 e) traversing said chamber openings with said access openings, said molds intermittently or continuously conveying in a sliding motion, and
 f) impressing said filling devices to any selected pressure, said pressure-controlled by a pressurizing means, thus
 g) flowing one or more of said liquids, thus
 h) filling said molds with said liquids in a sequence, said sequence with predetermined degree of simultaneous overlap by means of design of said access openings,
 i) maintaining said sealing after completion of said filling for a period of time,
 j) applying a pressure by a pressurizing means upon said liquids in said molds after completion of said filling for said period of time, and
 k) controlling said pressure after completion of said filling by a control means while said molds are still intermittently or continuously conveying,
 whereby, said filling of said molds with any of said liquids may be uninterrupted by said conveying of said molds, and duration of said filling may be independent of the duration of said conveying, and said duration of said filling may be independent of all molding process cycle times, and the duration of pressurization and amount of pressurization of completely filled molds may be independent of the pressurization of said filling, and any types of reactions or transformations of any of said liquids may proceed within said molds while conveying,
 whereby, production of molded or cast articles is at high speed and quality.

2. The method of filling a plurality of molds as claimed in claim 1 wherein any of said liquids is a molten metal.

3. The method of filling a plurality of molds as claimed in claim 1 wherein any of said liquids is a hardening polymer or plastic.

4. The method of filling a plurality of molds as claimed in claim 1 wherein any of said liquids is a hardening food.

5. The method of filling a plurality of molds as claimed in claim 1 wherein said sealing means is partially by compression of the bottom surface of said molds against an upper surface of said filling devices, said compression being formed at least partially as a result of gravity on said molds.

6. The method of filling a plurality of molds as claimed in claim 1 wherein said sealing means is partially by compression of a surface of said molds against a surface of said filling devices, said compression being at least partially a result of a mechanical pressure means applied on said molds.

7. The method of filling a plurality of molds as claimed in claim 1 wherein said sealing means is partially by compression of a continuous sheet of any material, said sheet being coupled to a surface of said molds, and said sheet traversing said chamber openings, said sheet sliding with said conveying of said molds, and said sheet in contact with a surface of said filling devices.

8. The method of filling a plurality of molds as claimed in claim 1, wherein the number of chamber openings is at least two, with at least one of said chamber openings being primarily for filling of said molds with a first liquid, and at least one other of said chamber openings being primarily for pressurizing another liquid to compensate for a change in volume of said first liquid.

* * * * *